United States Patent
Jones et al.

(10) Patent No.: US 6,317,774 B1
(45) Date of Patent: Nov. 13, 2001

(54) PROVIDING PREDICTABLE SCHEDULING OF PROGRAMS USING A REPEATING PRECOMPUTED SCHEDULE

(75) Inventors: Michael B. Jones, Redmond; Richard P. Draves, Jr., Seattle, both of WA (US); Daniela Rosu; Marcel-Catalin Rosu, both of Atlanta, GA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 08/781,106

(22) Filed: Jan. 9, 1997

(51) Int. Cl.⁷ .............................. G06F 9/00; G06F 15/173
(52) U.S. Cl. ........................ 709/107; 709/103; 709/104; 709/226
(58) Field of Search ............................... 709/300–305, 709/100–107, 226; 395/706, 208; 370/232, 319, 327; 705/9; 710/244; 701/129

(56) References Cited

U.S. PATENT DOCUMENTS

| | | | | |
|---|---|---|---|---|
| 5,301,333 | * | 4/1994 | Lee ........................................ | 710/244 |
| 5,392,430 | * | 2/1995 | Chen et al. ........................... | 709/102 |
| 5,467,268 | * | 11/1995 | Sisley et al. .............................. | 705/9 |
| 5,606,695 | * | 2/1997 | Dworzecki . | |
| 5,634,113 | * | 5/1997 | Rusterholz . | |
| 5,768,594 | * | 6/1998 | Blelloch et al. . | |
| 5,781,531 | * | 7/1998 | Charny .................................. | 370/232 |
| 5,812,844 | * | 9/1998 | Jones et al. . | |
| 5,978,363 | * | 11/1999 | Dimitrijevic et al. ............... | 370/319 |
| 6,003,061 | * | 12/1999 | Jones et al. . | |
| 6,041,354 | * | 3/2000 | Biliris et al. ......................... | 709/226 |
| 6,049,332 | * | 4/2000 | Boetje et al. ......................... | 345/327 |

OTHER PUBLICATIONS

Bacelli et al "Extremal scheduling of parallel processing with and withour real–time constraints", ACM digital library, 1993.*

David Anderson, Metascheduling for continuous media, ACM digital library, 1993.*

(List continued on next page.)

*Primary Examiner*—Larry D. Donaghue
(74) *Attorney, Agent, or Firm*—Leydig, Voit & Mayer, Ltd.

(57) ABSTRACT

The present invention provides predictable scheduling of programs using a repeating precomputed schedule. In a preferred embodiment, a scheduler accesses an activity scheduling graph. The activity scheduling graph is comprised of nodes each representing a recurring execution interval, and has one root, one or more leaves, and at least one path from the root to each leaf. Each node is on at least one path from the root to a leaf, and the number of times the execution interval represented by each node occurs during the traversal of the graph is equal to the number of paths from the root to a leaf that the node is on. Each node has associated with it an execution interval length, and is adapted to being dedicated to executing the threads of a single activity. The scheduler first selects a current node within the accessed scheduling graph. When the processor becomes available to execute threads, the scheduler advances from the current node to a new current node in accordance with a root-to-leaf traversal of the scheduling graph. After advancing to the new current node, the scheduler executes one or more threads of the activity to which the new current node is dedicated for the execution interval length associated with the new current node. In a further preferred embodiment, the scheduler allocates specific iterations through specific nodes to satisfy the constraints submitted by threads.

10 Claims, 34 Drawing Sheets

OTHER PUBLICATIONS

Mercer et al, "Processor capacity reserves: operating system support for multimedia applications", IEEE electronic library, pp. 90–99, 5/94.*

Jones et al, "Modular real–time resource management in the Rialto operating system", IEEE electronic library, pp. 12–17, 9/95.*

Jones et al., "CPU Reservations and Time Constraints: Predictable Scheduling of Independent Activities" *Proceedings of the 16th ACM Symposium on Operating Systems Principles.*, Saint–Malo, France, pp. 198–211, Oct. 1997.

K. Ramamritham et al., "Efficient Schduling Algorithms for Real Time Multiprocessor Systems", *IEEE Transactions on Parallel and Distributed Systems*, 1(2):184–194, Apr. 1990.

Anderson et al., "Support for Continuous Media in the Dash System," in *Proceedings of the 10th International Conference on Distributed Computing Systems*, Paris, France, May 1990, pp. 54–61.

Bollella et al., "Support for Real–Time Computing Within General Purpose Operating Systems: Supporting Co–Resident Operating Systems," in *Proceedings of the IEEE Real–Time Technology and Applications Symposium*, Chicago, IL, May 1995, pp. 4–14.

Bolosky et al., "Distributed Schedule Management in the Tiger Video Fileserver," in *Proceedings of the 16th ACM Symposium on Operating Systems Principles*, Saint–Malo, France, Oct. 1997.

Bolosky et al., "The Tiger Video Fileserver," in *Proceedings of the 6th International Workshop on Network and Operating System Support for Digital Audio and Video*, IEEE Computer Society, Zushi, Japan, Apr. 1996.

Clark et al., "Supporting Real–Time Applications in an Integrated Services Packet Network: Architecture and Mechanism," *ACM SIGCOMM*, 1992, pp. 14–26.

Deng et al., "Dynamic Scheduling of Hard Real–Time Applications Environment," in *Proceedings of the Real–Time Systems Symposium*, Washington, DC, Dec. 1996.

Dertouzos et al., "Multiprocessor On–Line Scheduling of Hard–Real–Time Tasks," *IEEE Transactions on Software Engineering*, 15(12):1497–1506, 1989.

Ford et al., "Evolving Mach 3.0 to a Migrating Thread Model," in *Proceedings of the Winter 1994 USENIX Conference*, USENIX Association, San Francisco, CA, Jan. 1994, pp. 97–114.

Golub, David B., "Operating System Support for Coexistence of Real–Time and Conventional Scheduling," Technical Report CMU–CS–94–212, Carnegie Mellon University, Pittsburgh, PA, 1994.

Jones et al., "Modular Real–Time Resource Management in the Rialto Operating System," in *Proceedings of the 5th Workshop on Hot Topics in Operating Systems*, IEEE Computer Society, Orcas Island, WA, May 1995, pp. 12–17.

Jones et al., "An Overview of the Rialto Real–Time Architecture," in *Proceedings of the 7th ACM SIGOPS European Workshop*, Connemara, Ireland, Sep. 1996, pp. 249–256.

Khanna et al., "Realtime Scheduling in SunOS 5.0," in *Proceedings of the Winter 1992 USENIX Conference*, USENIX Association, San Francisco, CA, Jan. 1992.

Leslie et al., "The Design and Implementation of an Operating System to Support Distributed Multimedia Applications," *Journal on Selected Areas in Communications*, 13(4), May 1995.

Mercer et al., "Processor Capacity Reserves: Operating System Support for Multimedia Applications," in *Proceedings of the IEEE International Conference on Multimedia Computing and Systems*, May 1994.

Nieh et al., "The Design, Implementation and Evaluation of SMART: A Scheduler for Multimedia Applications," in *Proceedings of the 16th ACM Symposium on Operating Systems Principles*, Saint–Malo, France, Oct. 1997.

Stoica et al., "A Proportional Share Resource Allocation Algorithm for Real–Time, Time–Shared Systems," in *Proceedings of the Real–Time Systems Symposium*, Washington, DC, Dec. 1996.

Waldspurger, Carl A., "Lottery and Stride Scheduling: Flexible Proportional–Share Resource Management," dissertation, Massachusetts Institute of Technology, 1995, pp. 4–5, 8–151.

Chih–wen Hsueh and Kwei–Jay Lin, "An Optimal Pinwheel Scheduler Using the Single–Number Reduction Technique," *Proceedings Real–Time Systems Symposium—IEEE Computer Society*, pp. 196–205, 1996.

Bryan Ford & Sai Susarla, "CPU Inheritance Scheduling," *USENIX Ass'n., Proceedings of the Second Symposium on Operating Systems Design and Implementation (OSDI '96*, pp. 91–105, 1996.

Pawan Goyal, Xingang Guo & Harrick M. Vin, "A Hierarchical CPU Scheduler for Multimedia Operating Systems," *USENIX Ass'n., Proceedings of the Second Symposium on Operating Systems Design and Implementation (OSDI '96*, pp. 107–121, 1996.

* cited by examiner

1 — 50

($A_c$)

— 99

| time of next iteration | allocated to constraint |
|---|---|
| 125-126 | $C_{c1}$ |
| 165-166 | $C_{c1}$ |
| 205-206 | unallocated |
| 245-246 | unallocated |
| 285-286 | unallocated |
| 325-326 | unallocated |
| 365-366 | unallocated |
| 405-406 | unallocated |

| time of next iteration | allocated to constraint |
|---|---|
| 125-126 | $C_{C1}$ |
| 165-166 | $C_{C1}$ |
| 205-206 | unallocated |
| 245-246 | identified for allocation to $C_{C2}$ |
| 285-286 | identified for allocation to $C_{C2}$ |
| 325-326 | identified for allocation to $C_{C2}$ |
| 365-366 | identified for allocation to $C_{C2}$ |
| 405-406 | unallocated |

| time of next iteration | allocated to constraint |
|---|---|
| 125-126 | $C_{C1}$ |
| 165-166 | $C_{C1}$ |
| 205-206 | identified for allocation to $C_{C3}$ |
| 245-246 | identified for allocation to $C_{C3}$ |
| 285-286 | identified for allocation to $C_{C3}$ |
| 325-326 | identified for allocation to $C_{C3}$ |
| 365-366 | identified for allocation to $C_{C3}$ |
| 405-406 | unallocated |

FIG. 26

PROVIDING PREDICTABLE SCHEDULING OF PROGRAMS USING A REPEATING PRECOMPUTED SCHEDULE

TECHNICAL FIELD

The invention relates generally to the field of processor scheduling, and, more specifically, to the field of scheduling the execution of real-time programs and non-real-time programs.

BACKGROUND OF THE INVENTION

Multitasking operating systems allow a number of different programs to execute "simultaneously" on a single processor. Such multitasking operating systems do so by rapidly switching the processor between the execution of multiple programs.

A single program, also known as a "process," may have one or more threads. The word "thread" as used herein means the finest scheduleable unit of execution. A thread is typically represented by a data structure called an execution context, which contains state information about the execution of the thread, such as register and stack contents. When the operating system suspends a thread in favor of the execution of another thread, it copies the information from the registers and stack to the thread's execution context. When the operating system subsequently reselects the thread for execution after suspending another thread, it copies the information in the thread's execution context back to the actual registers and stack. In this way, the thread continues executing with the same register and stack contents as when it was suspended. One or more threads often belong to a process, which corresponds to a body of code and which may own certain single-process resources, such as blocks of memory. While processes and programs can be viewed as roughly equivalent, in some cases, multiple processes may be said to constitute a program, and in other cases, a process may include several programs.

The process of determining which threads to execute at which times is generally termed "scheduling" a computer system's CPU. The way in which scheduling is performed can significantly impact a user's perception of whether individual threads are performing adequately. Modern multimedia applications, for example, often require substantial processor time, and appear to proceed slowly or in a jerky fashion if they do not receive the required processor time.

Real-time programs are programs that have an understanding of their execution performance needs and timeliness requirements, and can interact with a real-time interface of the operating system to make those execution performance needs and timeliness requirements known to the operating system, such as multimedia applications and industrial applications. Real-time programs can each have a number of threads of execution, grouped under one or more "activities," or aspects of the real-time program whose overall execution performance needs differ. Each activity may submit a processor reservation specifying the amount of processor time that its threads collectively need on an ongoing basis. Each thread may itself submit time constraints specifying that it needs a certain amount of processor time by a certain deadline. Reservations and time constraints are known collectively as "execution timing requests."

Certain conventional schedulers handle reservations and time constraints by maintaining the information relating to the reservations and time constraints for use in identifying the next thread to execute on an ad hoc basis each time the processor becomes available for reassignment to a new thread. This conventional "ad hoc" approach to scheduling has several disadvantages. First, completely reevaluating the relative urgencies of all of the existing threads each time the processor becomes available for reassignment often consumes substantial execution time, which makes this execution time unavailable to the real-time programs. Additionally, the approach cannot guarantee at the time a reservation or time constraint is submitted that the reservation or time constraint will be honored. The ad hoc approach can also cause unnecessarily frequent thread switches, thereby reducing the efficiency gains resulting from caching information relating to the executing thread. Further, reservations, while honored for specific periods of time under the ad hoc approach, are not executed with the regularity necessary to honor the reservations over every window of time.

SUMMARY OF THE INVENTION

The present invention provides predictable scheduling of real-time programs and non-real-time programs using a repeating precomputed schedule. In accordance with the invention, a thread scheduling software facility ("the scheduler") overcomes the shortcomings of the conventional ad hoc approach to scheduling by utilizing a precomputed schedule that specifies the future execution of activities and threads having outstanding time constraints, which significantly reduces the processing required to (A) identify the next thread to execute when the processor becomes available and (B) determine the amount of time for which to execute the identified thread. As a result, the process of identifying the next thread to execute and determining the amount of time for which to execute the identified thread can be performed in a bounded amount of time that is independent of the number of threads and activities being scheduled. The precomputed schedule allows the scheduler to assess the feasibility of reservations and time constraints when they are submitted, and immediately refuse any nonfeasible reservations and time constraints. The precomputed schedule also allows the scheduler to guarantee that reservations will be honored with regularity. The precomputed schedule further allows the scheduler to maximize the length of individual intervals assigned to each thread, thereby allowing each thread to make more efficient use of caches. The scheduler further enables blocked activities to receive extra processing time when they are unblocked. The scheduler further effectively schedules the simultaneous execution of real-time and non-real-time programs on the same processor. The scheduler further is able to effectively schedule non-real-time programs in the complete absence of real-time programs, reservations, and constraints.

The precomputed schedule is preferably represented as a directed acyclic graph of nodes, each node corresponding to an execution interval of a specified length, that is incrementally traversed to determine which activity to execute next. (As discussed herein, "executing an activity" means executing one or more threads belonging to the activity.) Each node may either be dedicated to an activity, such that its interval is used to execute that activity, or designated as a "free node," whose interval may be used to execute any activity. A complete traversal of the graph is made by traversing, in turn, each path from a root node to one of a group of leaf nodes. The sum of the lengths of the intervals of the nodes in each such path is equal. The number of paths that pass through each node determine the frequency with which its interval recurs while traversing the graph.

The scheduler incorporates reservations in the scheduling graph by dedicating one or more nodes of the graph to the activity submitting the reservation. Nodes are selected that are on enough paths to be executed frequently enough to satisfy the reservation, and whose intervals are long enough to satisfy the reservation. When the scheduler traverses to a node dedicated to the activity, the scheduler executes one or more threads of that activity. The scheduler incorporates time constraints in the scheduling graph by allocating to the time constraints specific traversals through nodes of the graph that are either dedicated to the activity of the thread submitting the time constraint or that are free nodes. When the scheduler performs the allocated traversals through these nodes, the thread submitting the time constraint is executed.

BRIEF DESCRIPTION OF THE DRAWINGS

FIG. 24 is a scheduling graph detail diagram showing the constraints to which iterations through a sample scheduling graph node are initially allocated.

FIG. 25 is a scheduling graph detail diagram showing the allocation of specific traversals of a node to a new constraint.

FIG. 26 is a scheduling graph detail diagram showing the reallocation of specific traversals through a node to a newly submitted critical constraint.

DETAILED DESCRIPTION OF THE INVENTION

Figure 1:
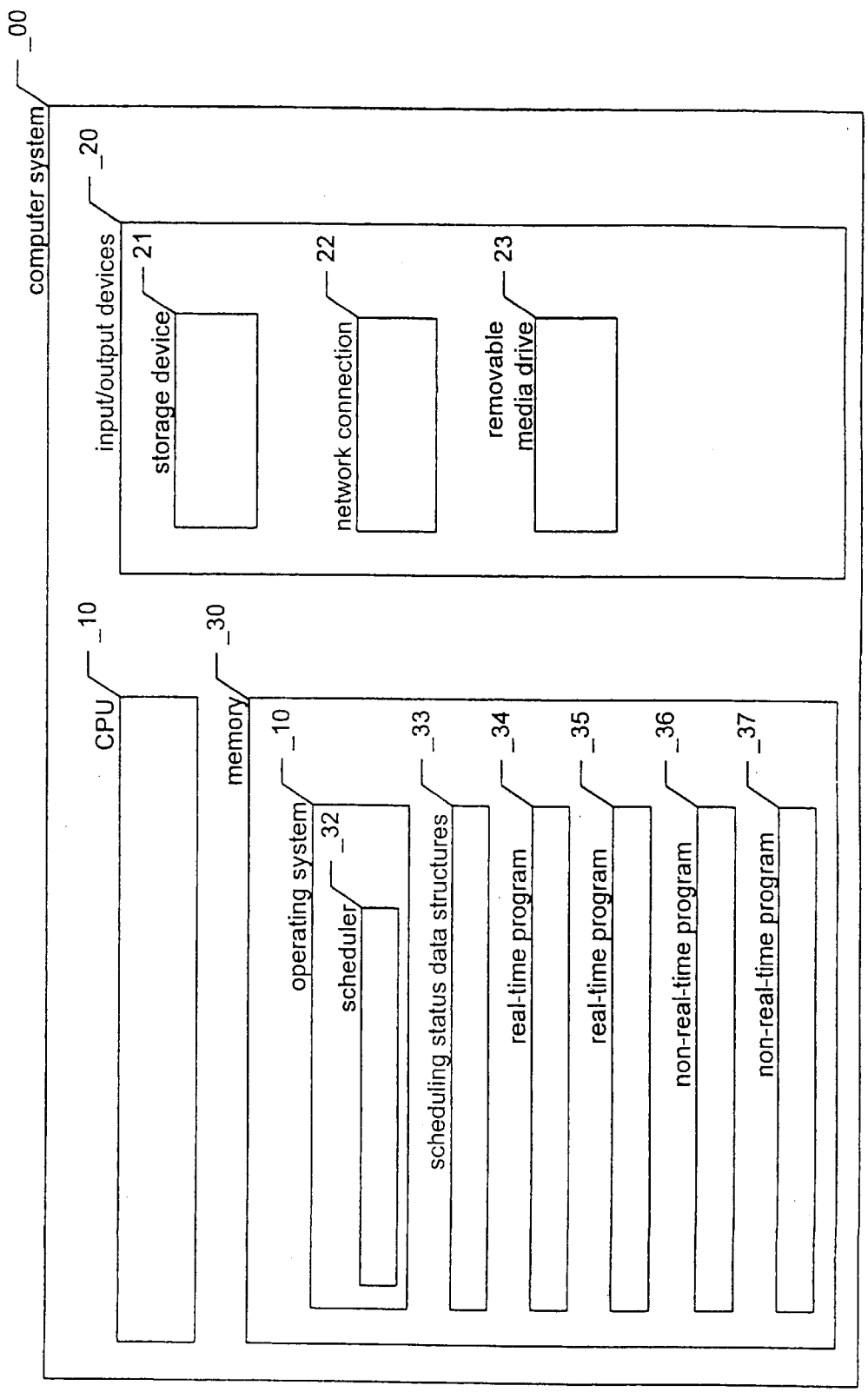
FIG. 1 is a high-level block diagram of the general-purpose computer system upon which the scheduler preferably executes.

The present invention provides predictable scheduling of real-time programs and non-real-time programs using a repeating precomputed schedule. In a preferred embodiment, a thread scheduling software facility ("the scheduler") utilizes a precomputed schedule that specifies the future execution of activities and threads having outstanding time constraints, which significantly reduces the processing required to identify the next thread to execute when the processor becomes available. As a result, the process of identifying the next thread to execute can be performed in a bounded amount of time that is independent of the number of threads and activities being scheduled. The precomputed schedule allows the scheduler to assess the feasibility of reservations and time constraints when they are submitted, and immediately refuse any nonfeasible reservations and time constraints. The precomputed schedule also allows the scheduler to guarantee that reservations will be honored with regularity. The precomputed schedule further allows the scheduler to maximize the length of individual intervals assigned to each thread, thereby allowing each thread to make more efficient use of caches. The scheduler further enables blocked activities to receive extra processing time when they are unblocked. The scheduler also supports embedded constraints, and the inheritance of constraints from threads blocked on a synchronization mechanism to the thread owning the synchronization mechanism. The scheduler further effectively schedules the simultaneous execution of real-time and non-real-time programs on the same processor. The scheduler further is able to effectively schedule non-real-time programs in the complete absence of real-time programs, reservations, and constraints.

The precomputed schedule is preferably represented as a directed acyclic graph of nodes, each node corresponding to an execution interval of a specified length, that is incrementally traversed to determine which activity to execute next. That is, when the processor becomes available for reassignment to a new thread, the graph is traversed from the current node to the next node, and the processor is assigned in accordance with the contents of the next node. Each node may either be dedicated to an activity, such that its interval is used to execute that activity, or designated as a "free node," whose interval may be used to execute any activity. A complete traversal of the graph is made by traversing, in turn, each path from a root node to one of a group of leaf nodes. The sum of the lengths of the intervals of the nodes in each such path is equal. The number of paths that pass through each node determine the frequency with which its interval recurs while traversing the graph.

A processor reservation ("reservation") is submitted by an activity, and specifies an amount of execution time and an interval called a "reservation window" ("window"). The reservation is a request to execute the activity's threads for a total amount of time at least as large as the specified amount of time during every time period that has the length of the specified reservation window. For example, a reservation specifying an amount of 30 time units and a window of 100 time units will be satisfied only if the threads of the submitting activity are executed for at least 30 time units during every period of time that is 100 time units long. In order to process a new reservation, the scheduler identifies one or more free nodes whose intervals are long enough and recurs frequently enough to satisfy the reservation, and assigns it to the activity submitting the reservation. If no such free node exists in the present graph, the scheduler attempts to rebuild the graph to accommodate the new reservations and previously accepted reservations. If it is impossible to so rebuild the graph, the scheduler refuses the new reservation.

A time constraint ("constraint") is submitted by a thread when it needs to perform a certain amount of execution during a particular period of time. Each time constraint specifies an estimate of the amount of processor time required to execute the constraint, a starting time identifying the time of which execution of the constraint can commence, and a deadline identifying the time by which execution of the constraint must be finished. For example, a constraint might specify that a thread be executed for 200 time units between a starting time of 1700 and an ending time of 2500. In order to process a new constraint, the scheduler allocates to the constraint specific future traversals through (a) nodes dedicated to the activity of the thread submitting the constraint and (b) free nodes at times within the range of time specified in the constraint totaling the execution time estimate of the constraint. If this is not possible, the scheduler refuses the constraint, but still uses the constraint to favor the thread submitting the constraint over other threads of the same activity until the constraint is completed. The scheduler tracks the amount of execution time committed to the constraint by deducting from the execution time estimate of the constraint the length of each period of time for which the constraint is executed. If the execution time estimate is exhausted before the submitting thread ends the constraint, the constraint ceases to receive allocated iterations through nodes, but retains a medium scheduling priority higher than the scheduling priority of activities having no constraints or reservations. If, on the other hand, the thread submitting a constraint ends the constraint while the constraint still has a positive execution time estimate, the scheduler converts this "thread constraint" to an "activity constraint," allowing any thread of that activity to which the submitting thread belongs to use iterations through nodes allocated to the constraint.

The scheduler schedules the execution of threads by traversing the graph. When a new node is entered during the scheduler's traversal, if the interval represented by the current traversal through the node is allocated to a constraint, the scheduler executes the thread of the accepted constraint that has the earliest deadline. If the interval represented by the current traversal through the node is not allocated to a constraint, but the node is dedicated to an activity, the scheduler selects a thread of that activity to execute. If the node is free or no threads in the activity to which the node is dedicated are presently executable, the scheduler executes a thread of an activity that recently blocked while executing. If no such activities exist, the scheduler selects a thread from the activity that least recently received any free time. When selecting a thread from an activity, the scheduler first selects from threads having failed constraints. If the activity has no such threads, the scheduler selects the thread of the activity that least recently received any free time.

FIG. 1 is a high-level block diagram of the general-purpose computer system upon which the scheduler preferably executes. The computer system 100 contains a central processing unit (CPU) 110, input/output devices 120, and a computer memory (memory) 130. Among the input/output devices is a storage device 121, such as a hard disk drive, and a network connection 122, through which the computer system 100 may communicate with other connected computer systems (not shown). The input/output devices also include a removable media drive 123, which can be used to install software products, including the scheduler, which are provided on a computer-readable medium, such as a CD-ROM. The memory 130 preferably contains an operating system 131, which preferably executes on the CPU 110 and includes the software scheduling facility (the scheduler) 132. The memory 130 further contains scheduling status data structures 133 used by the scheduler 132, and real-time programs such as real-time programs 134 and 135 and non-real-time programs 136 and 137 whose threads are executed by the computer system under the control of the scheduler. While the scheduler is preferably implemented on a computer system configured as described above, those skilled in the art will recognize that it may also be implemented on computer systems having different configurations. For example, the scheduler may preferably be implemented using a "set-top box," or specialized computer-based hardware device for interfacing televisions with information sources such as the Internet and dedicated entertainment servers. The scheduler may also preferably be implemented on multimedia servers providing information to requesting computers.

In order to more fully convey the details of the scheduler, the scheduler is discussed herein in conjunction with a specific example. Those skilled in the art will recognize that, because it was selected to facilitate this discussion, aspects of the example may differ from actual scheduling scenarios.

Table 1 shows a list of reservations submitted by activities in accordance with the example.

TABLE 1

| Activity | Amount Reserved | Reservation Window | Fraction of Total Execution Time |
|---|---|---|---|
| $A_A$ | 2 | 20 | 10% |
| $A_B$ | 2 | 10 | 20% |
| $A_C$ | 1 | 40 | 2.5% |
| $A_D$ | 5 | 40 | 12.5% |
| $A_E$ | 6 | 30 | 20% |
| $A_F$ | 3 | 40 | 7.5% |
| $A_G$ | 1 | 20 | 5% |
| $A_H$ | 1 | 40 | 2.5% |
|  |  |  | 80% |

Each row of the table corresponds to the reservation for a different activity, and shows, in arbitrary time units, the amount of execution time reserved for the activity and the length of the recurring reservation window in which the activity must receive the amount reserved on an ongoing basis. Each row further shows a fraction of the total available execution time that will be consumed by satisfying the reservation. For example, the second line of the table shows that, in accordance with the reservation for activity $A_B$, threads of activity $A_B$ must be executed for at least 2 time units during every period of time 10 time units long, thereby consuming 20% of the total available execution time.

Figure 2:
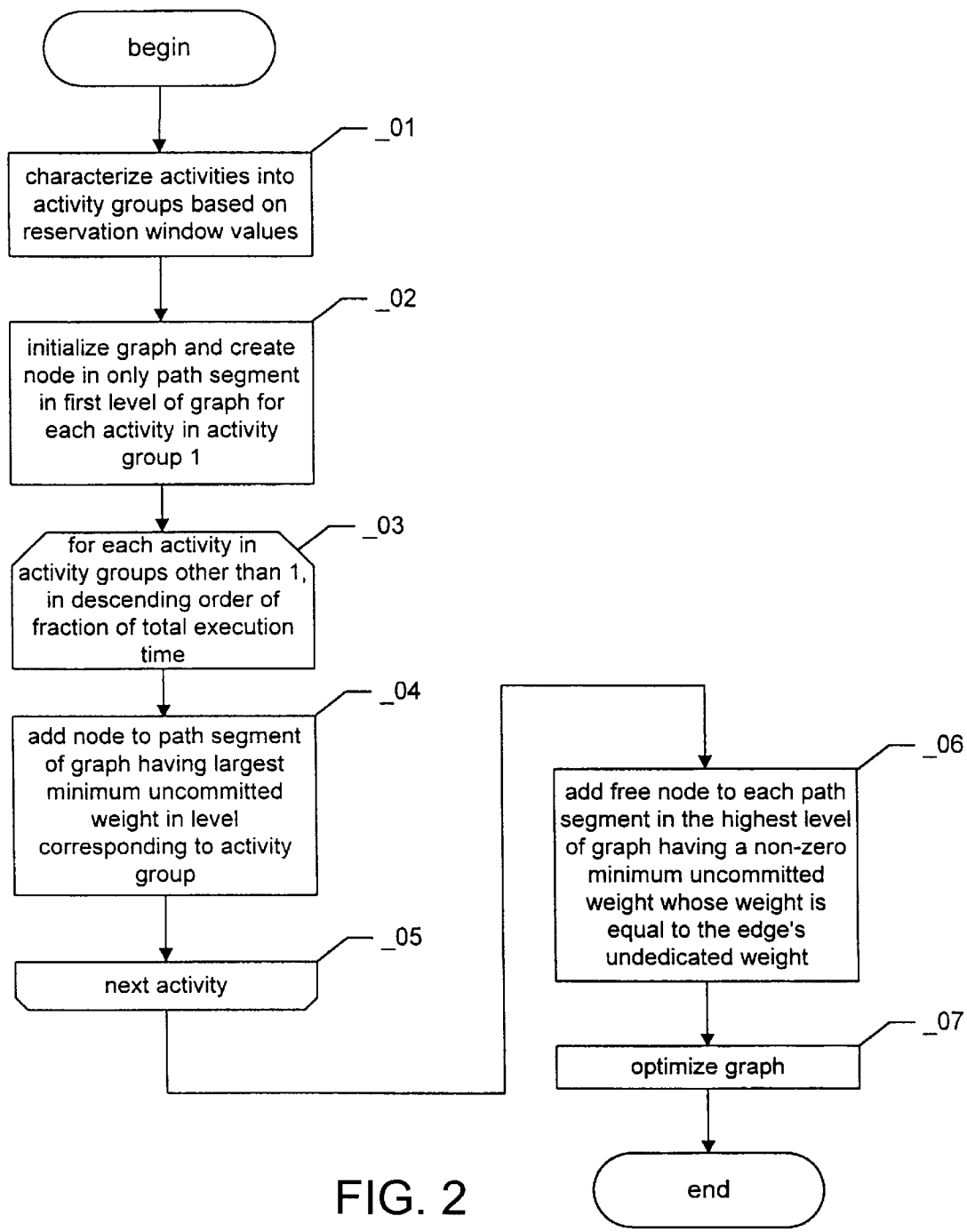
FIG. 2 is a flow diagram showing the steps preferably performed by the scheduler to construct a scheduling graph.

In order to design an execution schedule that will accommodate the set of reservations shown in Table 1, the scheduler constructs a scheduling graph. As is discussed in greater detail below, the scheduler preferably constructs a scheduling graph when the scheduler is started, as well as when reconstruction is required to accommodate a new reservation. FIG. 2 is a flow diagram showing the steps preferably performed by the scheduler to construct a scheduling graph. In step 201, the scheduler characterizes the activities by the relative length of their reservation windows, as shown below in Table 2.

TABLE 2

| Activity Group | Reservation Window Range | Activities |
| --- | --- | --- |
| 1 | 10–19 | $A_B$ |
| 2 | 20–39 | $A_A, A_E, A_G$ |
| 3 | 40–79 | $A_C, A_D, A_F, A_H$ |

Table 2 shows that a first reservation window range extends from the smallest reservation window length (10 for activity $A_B$) to just less than $2^1$ times the smallest reservation window length (19), a second range extends from $2^1$ times the smallest reservation window length (20) to just less than $2^2$ times the smallest reservation window length (39), and a third range extends from $2^2$ times the smallest reservation window length (40) to just less than $2^3$ times the smallest reservation window length (79). The constructed scheduling graph will have a number of different paths from its root to its leaves, each having the same total weight, which is equal to the smallest reservation window length. The scheduling graph contains branches, which delineate both levels of the graph and segments of the root-to-leaf paths.

Those activities occurring in the first group will be located on the only path segment at the first level of the scheduling graph, and will be on every path from the root of the scheduling graph to a leaf. Activities in the second activity group will be located on one of the two path segments in the second level of the scheduling graph and will be on one-half of the paths from the root of the scheduling graph to a leaf. Finally, the activities in the third activity group will be located on one of the four path segments at the third level of the scheduling graph, and will be on one-fourth of the paths from the root of the scheduling graph to a leaf.

Figure 3:
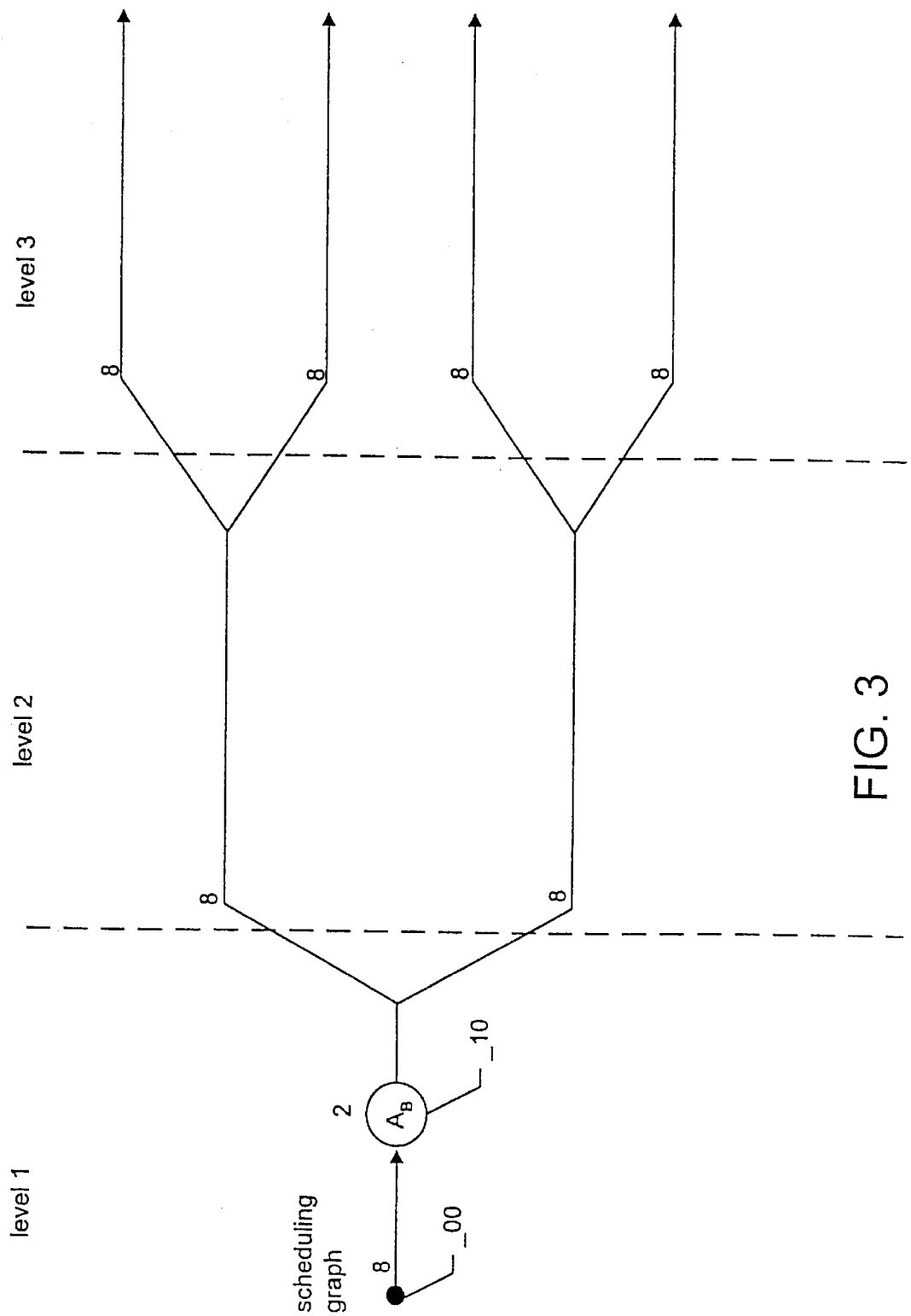
FIGS. 3, 4, 5, 6, 7, 8, 9, 10, 11, and 12 are scheduling graph diagrams showing the construction of a sample scheduling graph.

Returning to FIG. 2, in step 202, the scheduler initializes the scheduling graph and, for each activity in activity group 1, creates a node in the only path segment in the first level of the scheduling graph. FIG. 3 is a scheduling graph diagram showing the construction of the first level of a scheduling graph designed to accommodate the set of reservations shown in Table 1. FIG. 3 shows a scheduling graph having a root 300. The graph has a single path segment in level 1, which branches into two path segments in level 2, which in turn branches into four path segments in level 3. To construct the first level of the scheduling graph, the scheduler inserts a node for each activity in the first activity group as a chain of successive descendants of the root. In the case of the example, the scheduler creates one node 310 for activity $A_B$, the only activity in the first group. Each node receives a weight equal to the reservation amount of the reservation for the activity, multiplied by the ratio of the floor of the reservation window range for the activity's activity group to the requested reservation window for the activity. Because the reservation for activity $A_B$ specifies a reservation amount of 2 time units, the floor of activity group B is 10 time units, and the requested reservation window for activity $A_B$ is 10 time units, node 310 has weight 2 (2×10/10). The scheduler preferably also returns to the activity an indication of the actual reservation amount (the node weight) and reservation window (the floor of the reservation window range for the activity's activity group) accorded to the activity (not shown). If this actual reservation is unacceptable to the activity, the activity may withdraw this reservation and submit a revised one. After adding the nodes from activity group 1 to level 1 of the graph, the scheduler calculates, for each path segment, the smallest uncommitted weight of any of the root-to-leaf paths that the path segment is part of. It can be seen from FIG. 3 that, because node 310 having weight 2 is on each of the four root-to-node paths, each of these paths has uncommitted weight of 8. Every path segment therefore has a minimum uncommitted weight of 8 time units.

Returning to FIG. 2, in steps 203–205, the scheduler loops through the activities in the activity groups besides activity group 1 in descending order of fraction of total execution time. In step 204, the scheduler adds a node to the graph for the current activity having a weight equal to the reservation amount of the reservation for the activity, multiplied by the ratio of the floor of the reservation window range for the activity's activity group to the actual reservation window for the activity. The scheduler adds the node in the level of the graph corresponding to the current activity's activity group to the path segment in that level having the largest minimum uncommitted weight. If that largest minimum uncommitted weight is smaller than the weight required for the node of the current activity, the scheduler preferably assigns all of the minimum uncommitted weight of the path segment having the largest minimum uncommitted weight to a node for the activity, and proceeds to add additional nodes to one or more additional path segments in that level for the balance of the weight required for the current activity. In cases in which the weight of these additional nodes would be smaller than a minimum weight corresponding to the amount of time required to perform 50–100 context switches, the node created in the path segment having the largest minimum uncommitted weight is preferably assigned less than the entire largest minimum uncommitted weight so that the additional node may exceed the minimum node weight. Also, when adding a node to a path segment and the weight of the node is smaller than the minimum uncommitted weight of the path segment, the facility preferably ensures that the minimum uncommitted weight of the path segment after adding the node will not be less than the minimum nodal weight. If the remaining uncommitted weight of the path segment would be less than the minimum node weight, then the scheduler preferably reduces the weight of the node added to that path segment for the activity and adds an additional node to another path segment for the activity. Alternatively, the facility assigns to the node the entire minimum nodal weight of the path segment, so that the total weight of the node exceeds the reservation amount for the activity by up to the amount of time required to perform a few context switches. In step 205, the scheduler loops back to step 203 to process the next activity.

Figure 4:
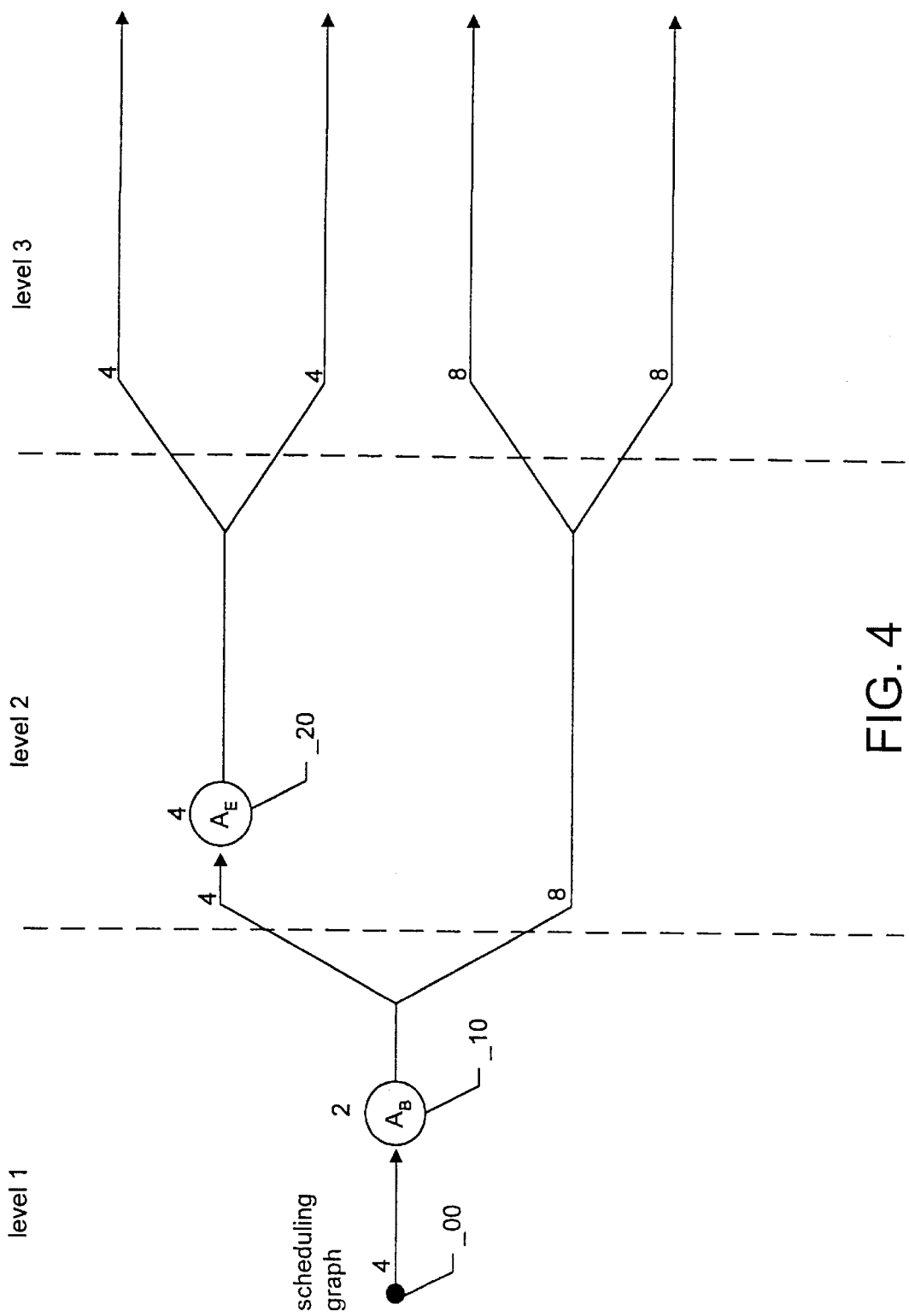

FIGS. 4–12 are scheduling graph diagrams showing the construction of the sample scheduling graph in accordance with steps 203–205. FIG. 4 shows that the scheduler first processes activity $A_E$, which has the largest remaining fraction of total execution time (20%). Level 2 of the scheduling graph has two path segments, each having minimum uncommitted weights of 8. The scheduler adds node 420 to the upper path segment for activity $A_E$, giving it a weight of 6×20/30, or 4. After adding the node, the scheduler adjusts the largest minimum uncommitted weight of all of the affected path segments: because new node 420 is on both of the top two root-to-leaf paths, the scheduler reduces the minimum uncommitted weight for each of the four path segments on these two root-to-leaf paths from 8 to 4. It should be noted that scheduling a reservation for activity $A_E$ as discussed above, the actual reservation amount is 4 rather than 6 and the actual reservation window is 20 rather than 30. While using this scheduling graph will result in activity $A_E$ being executed for 4 of every 20 time units, activity $A_E$ will not necessarily always be executed for 6 of every 30 time units as requested. In this sense, the scheduler does not honor the request for reservation with regularity. The scheduler does, however, return an indication to activity $A_E$ of the actual reservation amount and actual reservation window, allowing activity $A_E$ to modify its reservation if receiving 4 out of every 20 time units is unacceptable to the activity.

Figure 5:
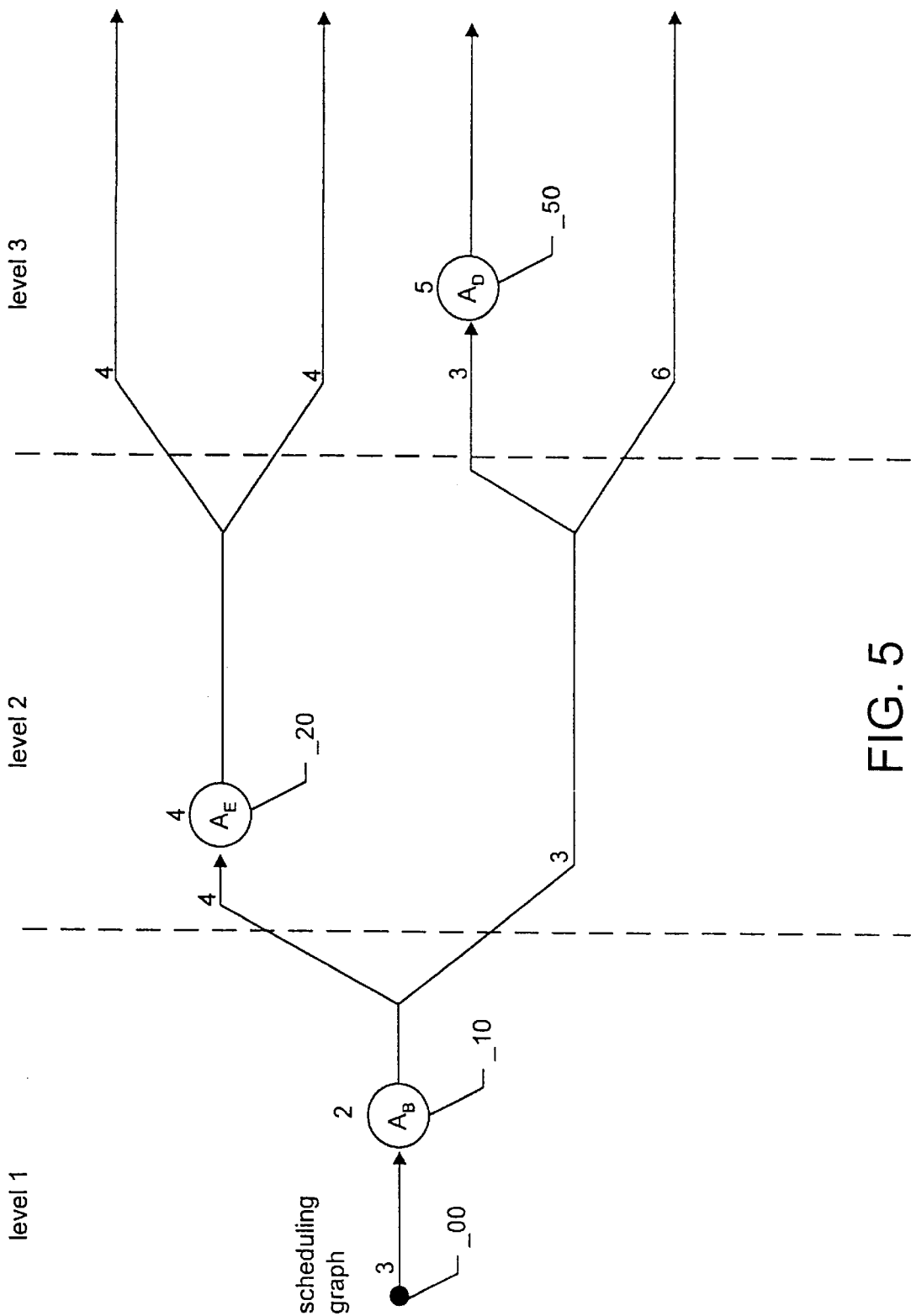

FIG. 5 shows the scheduler adding a node for activity $A_D$ to the scheduling graph. Because activity $A_D$ has the next-largest fraction of total processing time (12.5%), the scheduler creates a node for its reservation next. The scheduler adds node 550 to the third path segments of level 3, because it has the largest minimum uncommitted weight (8 vs. 4). Node 550 has a weight of 5 (5×40/40). Because new node 550 is on the third root-to-node path, the scheduler reduces the minimum uncommitted weight of the one level 1, one level 2, and one level 3 path segments on the third root-to-leaf path from 8 to 3.

Figure 6:
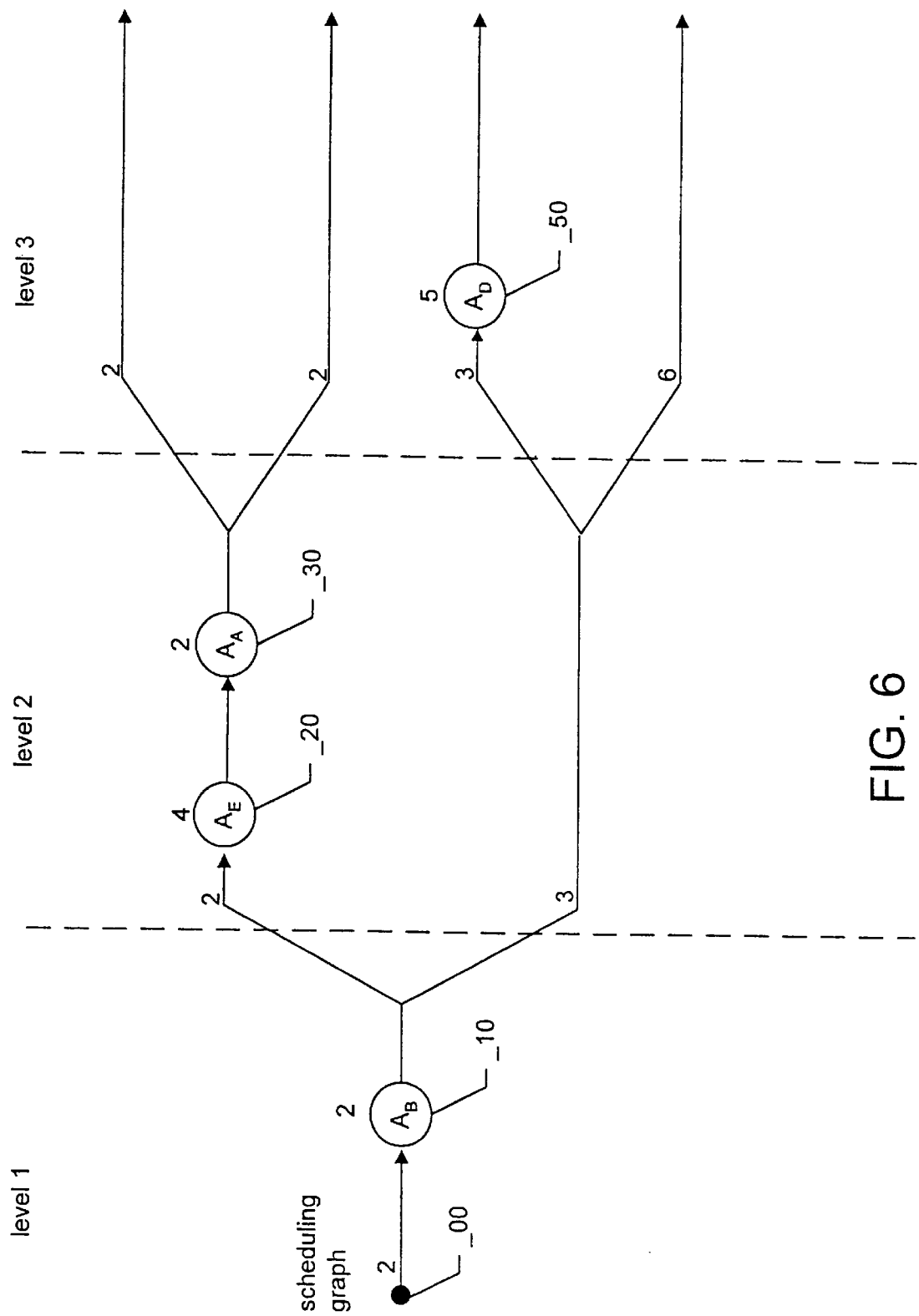

FIG. 6 shows the scheduler adding the final reservation node to level 2 for activity $A_A$. The scheduler creates the node 630 having weight 2 for activity $A_A$ in the upper path segment of level 2, as this path segment has the largest minimum uncommitted weight among the path segments of level 2 (4 vs. 3). The scheduler reduces the minimum uncommitted weights of the one level 1, one level 2, and two level 3 path segments on the upper two root-to-leaf paths from 4 to 2.

Figure 7:
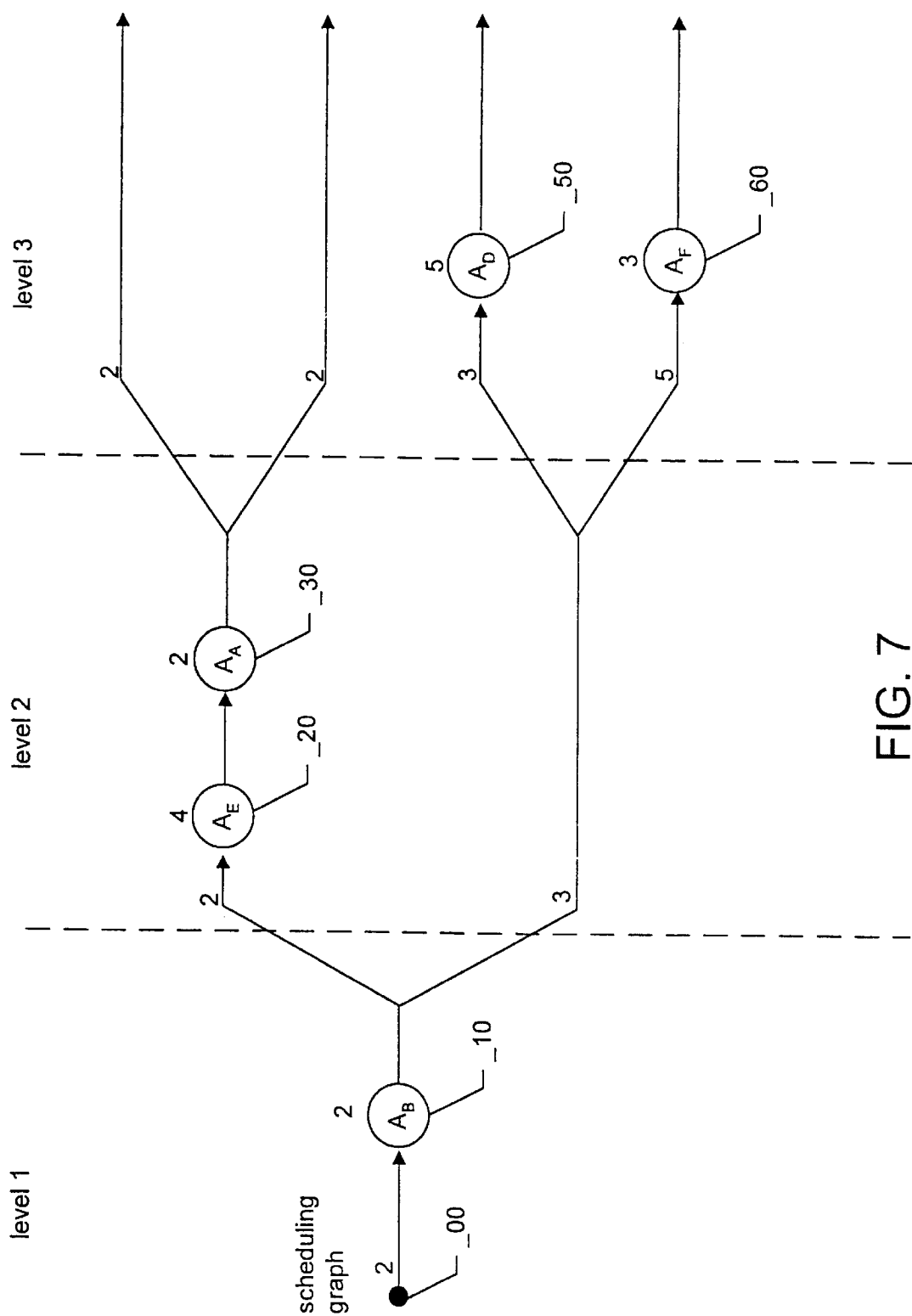
Figure 8:
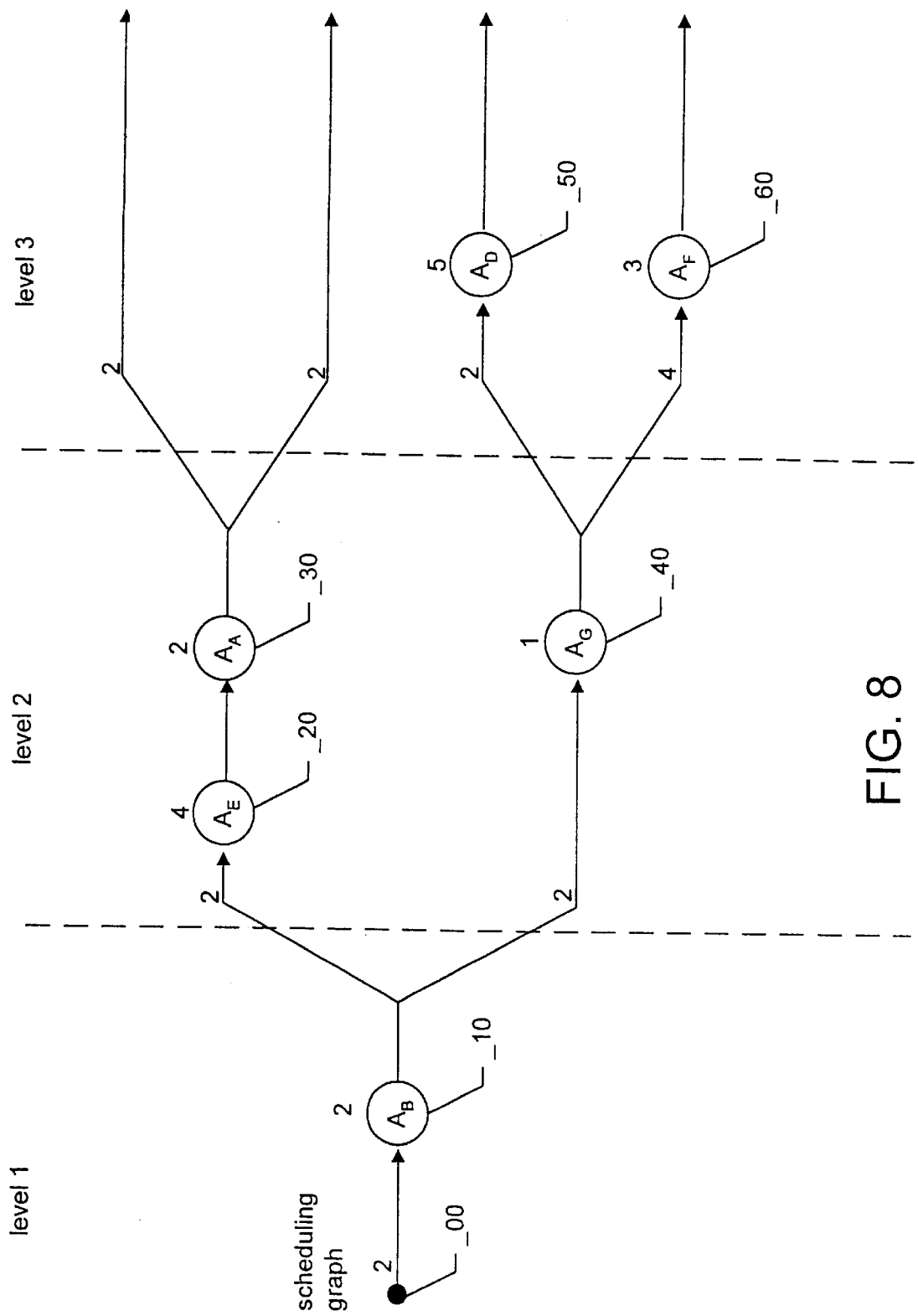
Figure 9:
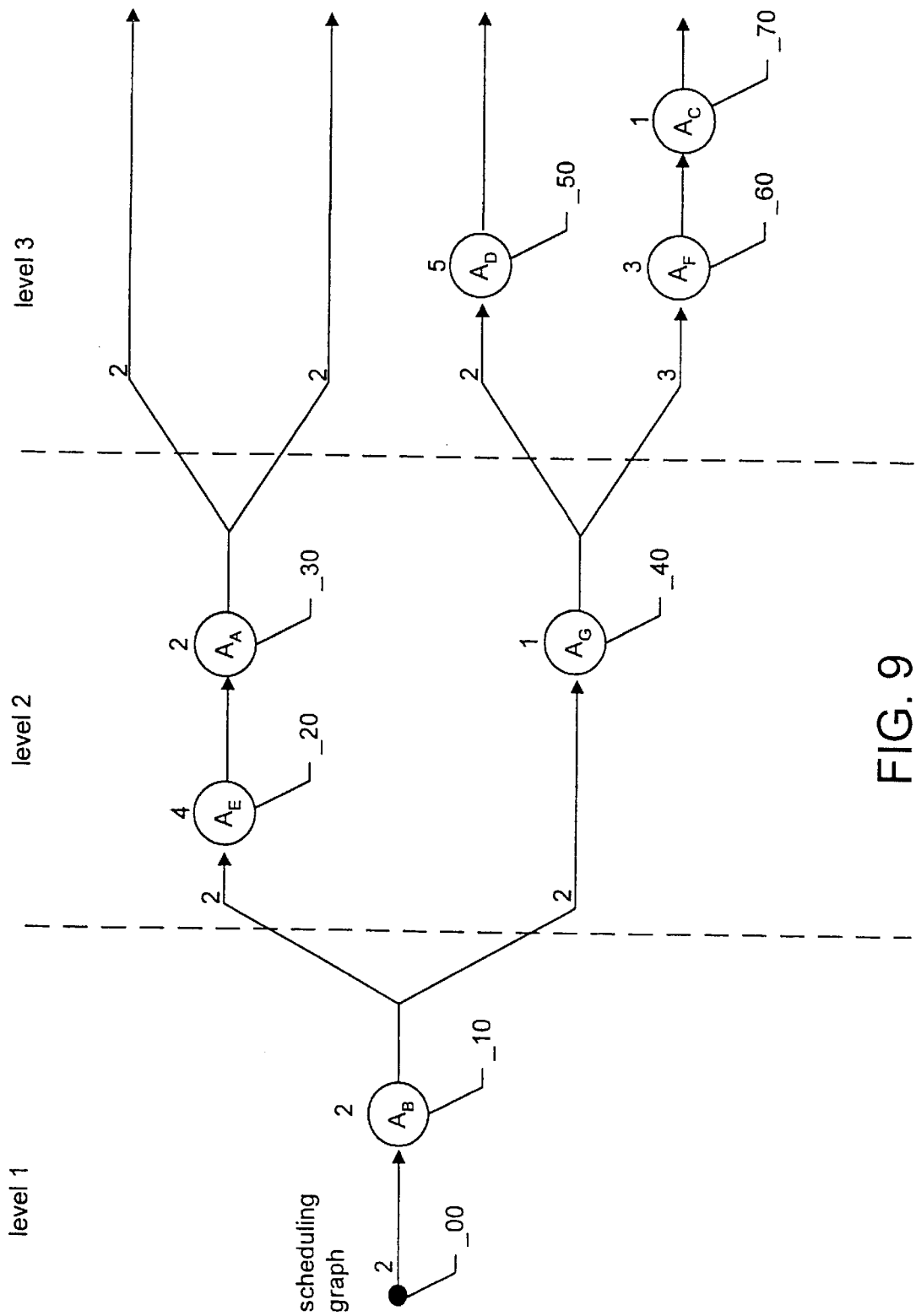
Figure 10:
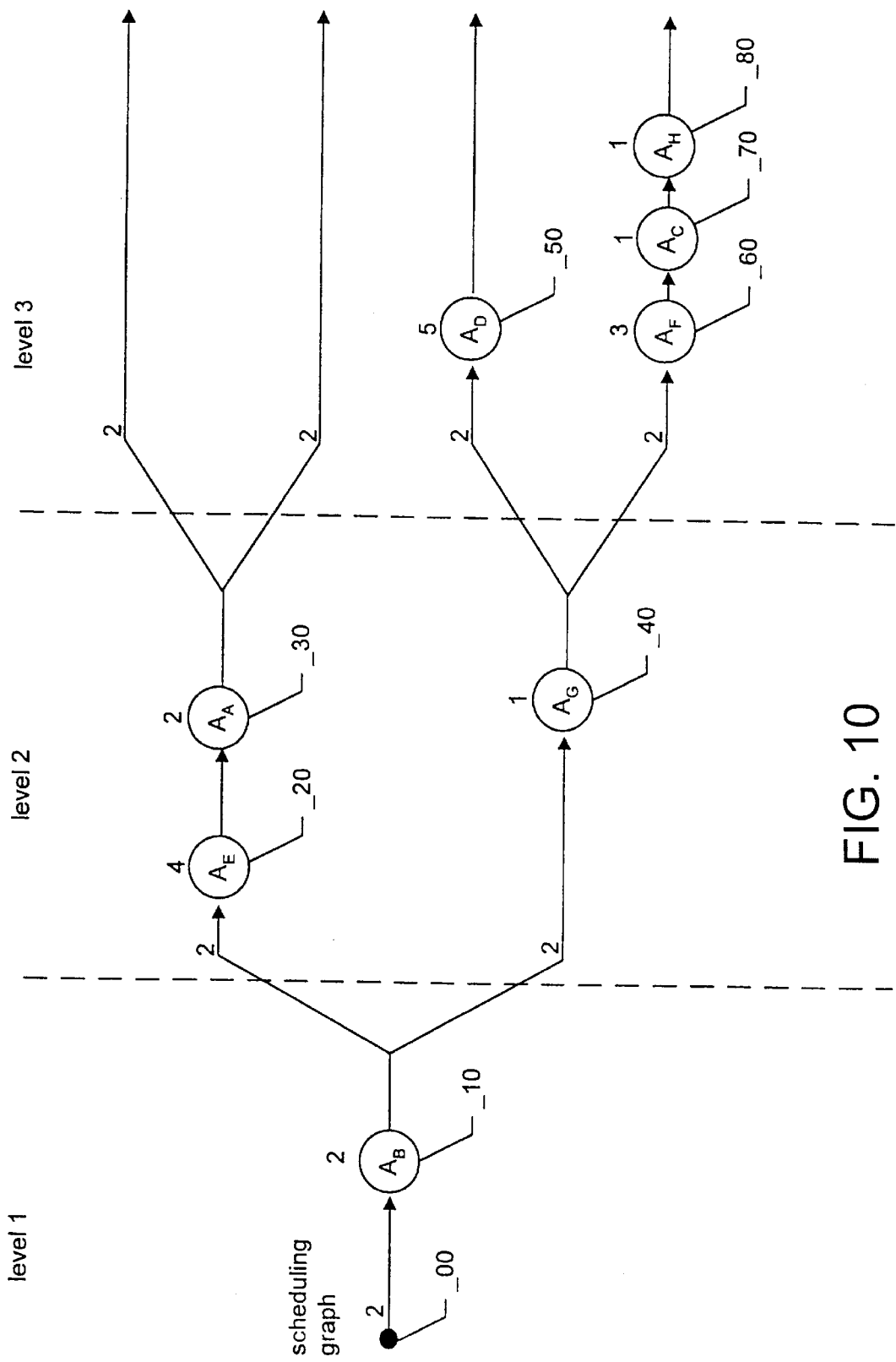

FIGS. 7, 8, 9, and 10 show the scheduler adding nodes to level 3 for activities in the third activity group. FIG. 7 shows the scheduler adding node 760 to activity $A_F$. FIG. 8 shows the scheduler adding node 840 for activity $A_G$. FIG. 9 shows the scheduler adding node 970 for activity $A_C$. FIG. 10 shows the activity adding node 1080 for activity $A_H$. In each case, the scheduler adds the node for the activity to the path segment of the appropriate level having the largest minimum uncommitted weight.

Figure 11:
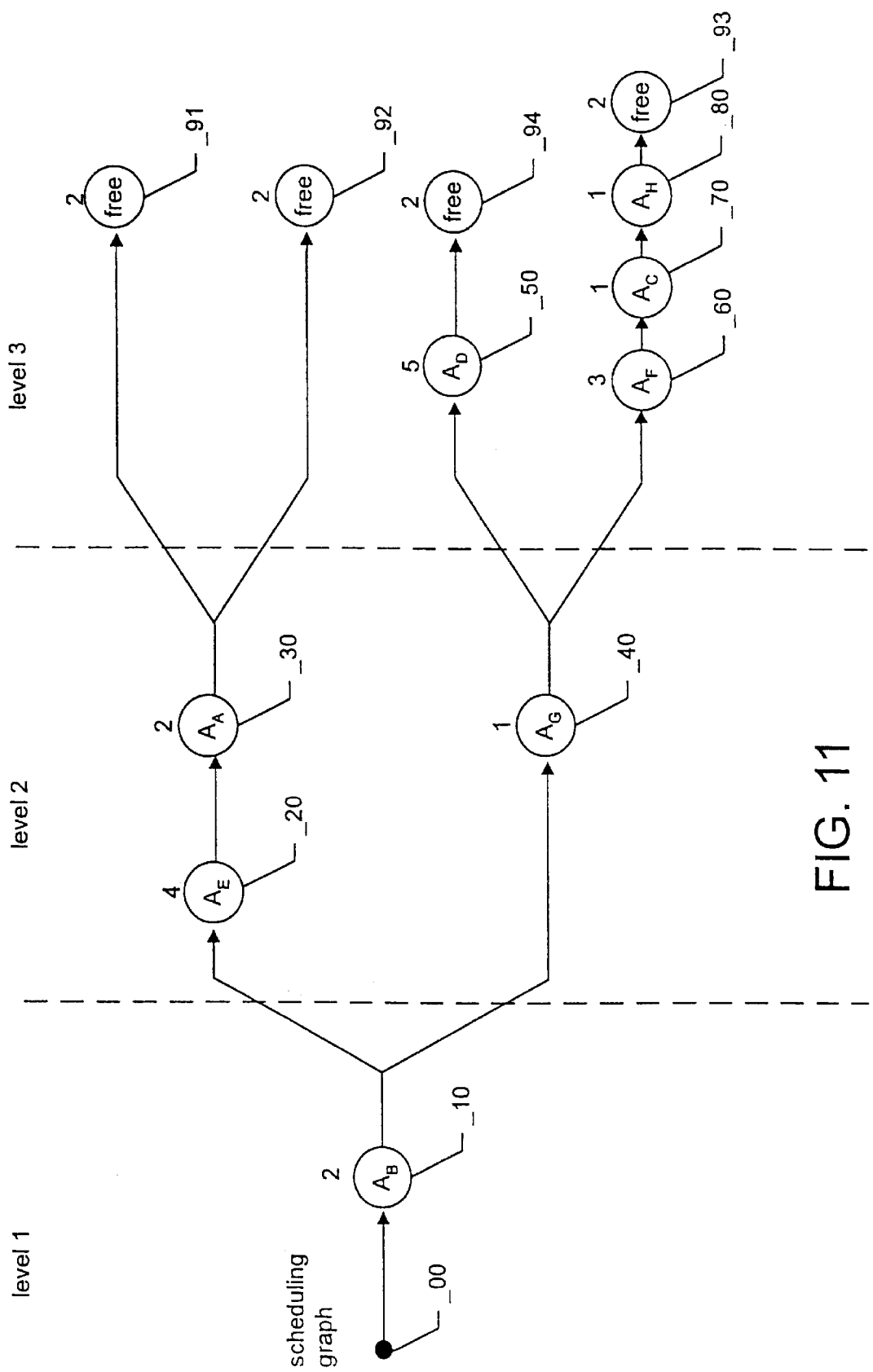

Returning to FIG. 2, in step 206, the scheduler adds a free node to each path segment in the highest level of the graph having a minimum uncommitted weight greater than zero. Each free node created in step 206 has a weight equal to the minimum uncommitted weight of its path segment. This renders zero the minimum uncommitted weight of every path segment of the graph. FIG. 11 shows the scheduler adding free nodes to the scheduling graph in step 206. It can be seen from FIG. 11 that the scheduler has added free nodes 1191, 1192, 1193, and 1194, each having weight 2, to the path segments of level 3. As a result, each of the four root-to-leaf paths has a total path weight of 10, which is equal to the minimum reservation window. The root-to-path traversal of this graph will cause the scheduler to satisfy the reservations shown in Table 1 with regularity.

Figure 12:
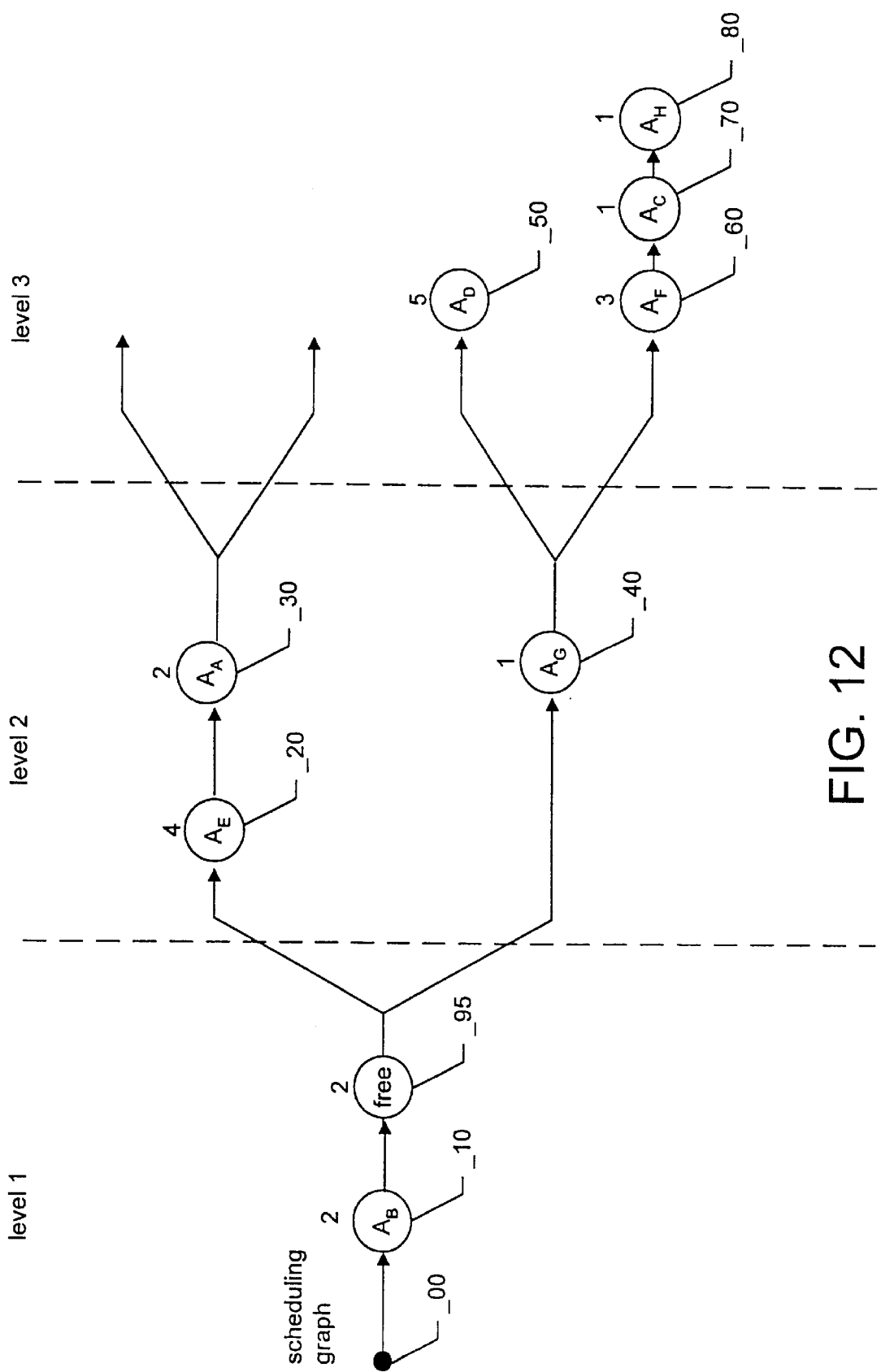

Returning to FIG. 2, in step 207, the scheduler preferably optimizes the graph to minimize the number of nodes and otherwise improve the efficiency of its storage and traversal. One way in which the scheduler optimizes the graph is by combining two nodes that occur in path segments after a particular branch into a single node in the path segment before that branch. FIG. 12 shows an example of the scheduler combining two identical nodes to optimize the sample scheduling graph. It can be seen by comparing FIG. 12 to FIG. 11 that nodes 1191, 1192, 1193, and 1194 (FIG. 11), which are all free nodes in level 3 having a weight of 2, have been replaced with node 1295 (FIG. 12), a free node in level 1 having weight 2. While this modification of the scheduling graph has reduced the number of nodes in the scheduling graph, the modified scheduling graph is similar to the scheduling graph shown in FIG. 11, as both of the top two root-to-leaf paths contain a free node having weight 2, albeit at a different position in these paths. After optimizing the graph in step 207, these steps conclude.

When the scheduler schedules the threads of activities in accordance with the scheduling graph shown in FIG. 12 by traversing the scheduling graph in root-to-leaf order, the activities are executed in the order and for the execution times shown in Table 3.

TABLE 3

| Activity | Execution Time |
|---|---|
| $A_B$ | 2 |
| free | 2 |
| $A_E$ | 4 |
| $A_A$ | 2 |
| $A_B$ | 2 |
| free | 2 |
| $A_G$ | 1 |
| $A_D$ | 5 |
| $A_B$ | 2 |
| free | 2 |
| $A_E$ | 4 |
| $A_A$ | 2 |
| $A_B$ | 2 |
| free | 2 |
| $A_G$ | 1 |
| $A_F$ | 3 |
| $A_C$ | 1 |
| $A_H$ | 1 |

The scheduler traverses each path by beginning at the root of the graph and traversing toward the leaves at each branch encountered while traversing toward the leaves, the scheduler follows the edge out of the branch that has been followed less recently than the other edge out of the branch. First, the scheduler traverses the nodes in the first path of the scheduling graph: activity $A_B$ node 1210, free node 1295, activity $A_E$ node 1220, and activity $A_A$ node 1230. Note that this involves following the top edge in the branch from free node 1295. When this branch is next encountered, the scheduler will follow the bottom edge from this branch. The scheduler then traverses the second path, containing activity $A_B$ node 1210, free node 1295, activity $A_G$ node 1240, and activity $A_D$ node 1250. The scheduler then traverses the third path of the scheduling graph, which is the same as the first path. Finally, the scheduler traverses the fourth path of the scheduling graph, containing activity $A_B$ node 1210, free node 1295, activity $A_G$ node 1240, activity $A_F$ node 1260, activity $A_C$ node 1270, and activity $A_H$ node 1280. The traversal of these four paths constitutes a complete traversal of the scheduling graph. Because the scheduler continues to cycle through complete traversals of the scheduling graph, after traversing the fourth path of the scheduling graph, the scheduler again traverses the first path of the scheduling graph. Those skilled in the art will appreciate that, if the activities of the example are executed as shown in Table 3, each of the reservations will be satisfied. In fact, not only will the reservations for the activities be satisfied for particular reservation windows, but they will be satisfied for every period of time having the same length as the reservation window length.

Figure 13A:
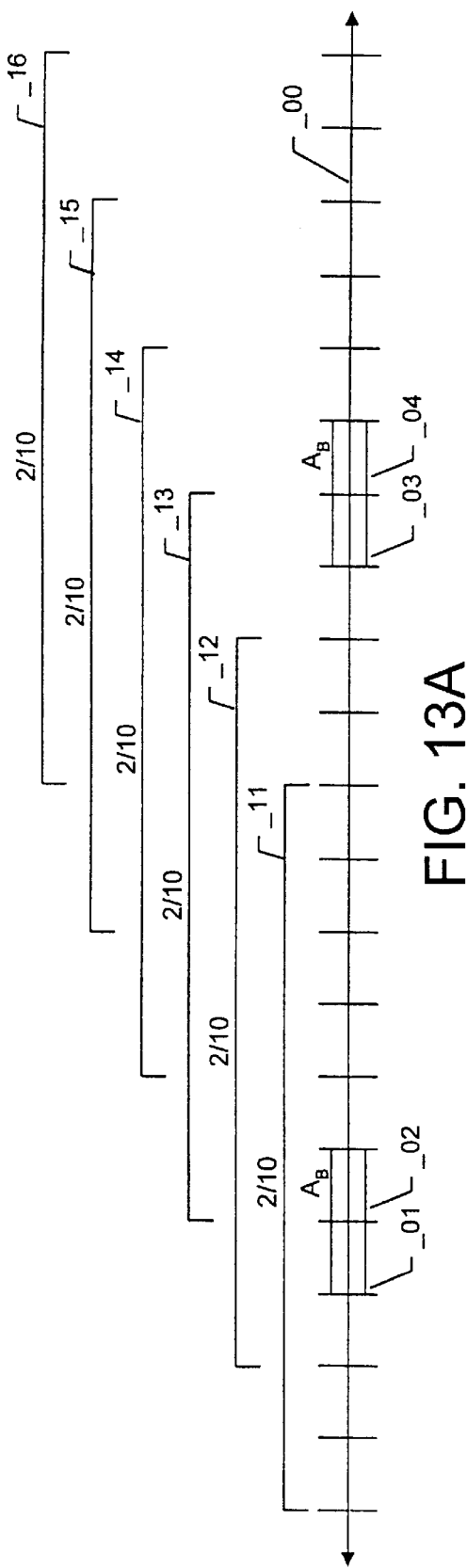
FIG. 13A is a timing diagram showing the execution of a reservation in accordance with the sample scheduling graph.

FIG. 13A is a timing diagram showing the execution of activity $A_B$ in accordance with the sample scheduling graph. FIG. 13A shows that activity $A_B$ is executed for 2 times units every 10 time units, the reservation window length for the reservation for activity $A_B$. That is, activity $A_B$ is executed for periods 2 time units long that begin exactly 10 time units apart. It can be seen that, as a result, sample time periods 1311, 1312, 1313, 1314, 1315, and 1316, all 10 time units long, each include 2 time units in which threads of activity $A_B$ are being executed. (These sample time periods are illustrative of the infinite number of time periods 10 time units long starting at different times, during each of which threads of activity $A_B$ are executed for 2 time units.) For example, time periods 1311 and 1312 both contain execution time periods 1301 and 1302 in which threads of activity $A_B$ are being executed. Time period 1313 contains execution time periods 1302 and 1303. Time periods 1314, 1315, and 1316 all contain execution time periods 1303 and 1304.

Figure 13B:
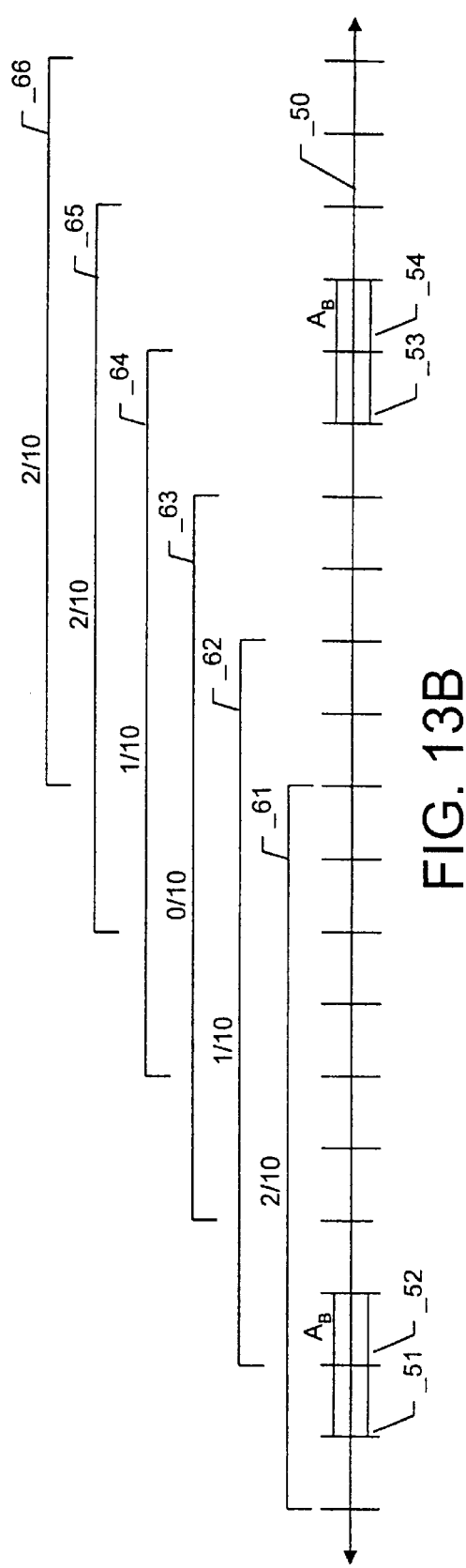
FIG. 13B is a timing diagram showing the conventional execution of a reservation.

By way of contrast, FIG. 13B is a timing diagram showing a more conventional execution of a reservation. It can be seen that there are several time periods 10 time units long in which the threads of activity $A_B$ are executed for the reservation amount of 2 time units: time periods 1361, 1365 and 1366. However, there are also several time periods corresponding to the reservation window length during which activity $A_B$ is executed for less than its reservation amount: threads of activity $A_B$ are executed for only one time unit during time periods 1362 and 1364, and are executed for 0 time units during period 1363. Because there are some periods of time having the same length as the reservation window during which threads of the activity are executed for less than the activity's reservation amount, the conventional approach depicted in FIG. 13B is said to schedule activities and satisfy reservations with less regularity than the scheduler of the present invention.

When the scheduler is started, it preferably constructs a scheduling graph for satisfying initially-pending reservations as described above. Also, when a new reservation is submitted by an activity, the scheduler may need to completely reconstruct the scheduling graph, as is discussed in more detail below. However, when the scheduler receives a new reservation, it first attempts to revise the existing scheduling graph to accommodate the new reservation before constructing a new scheduling graph.

Figure 14:
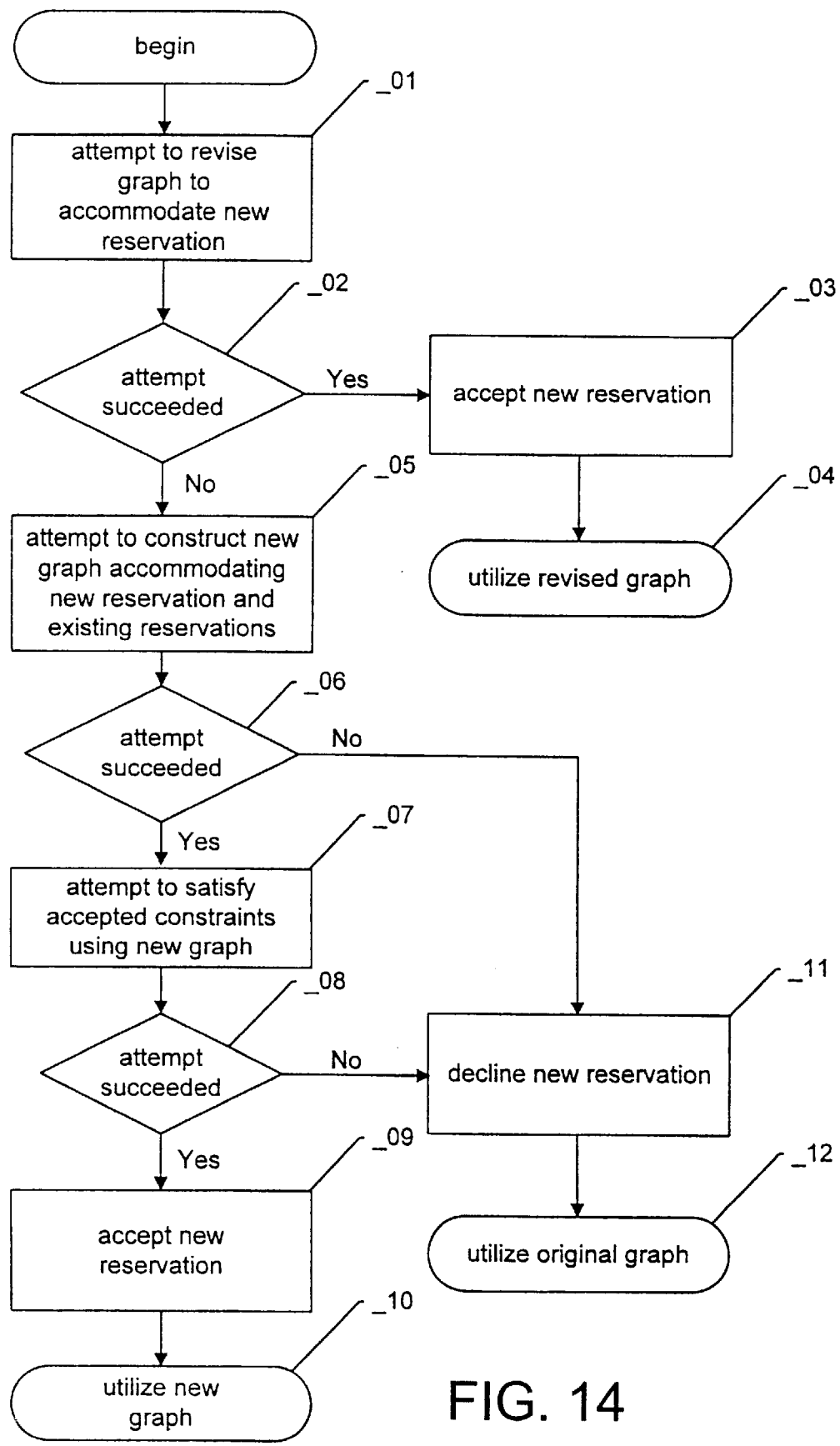
FIG. 14 is a flow diagram showing the steps preferably performed by the scheduler to process a submitted reservation.

FIG. 14 is a flow diagram showing the steps preferably performed by the scheduler to process a submitted reservation. In step 1401, the scheduler attempts to revise the scheduling graph to accommodate the new reservation. In step 1402, if the attempt of step 1401 succeeded, then the scheduler continues at step 1403, else the scheduler continues at step 1405. In step 1403, the scheduler accepts the new reservation, which was successfully accommodated by revising the graph in step 1401. Then, in step 1404, the scheduler utilizes the revised scheduling graph, and these steps conclude. In step 1405, the scheduler attempts to construct a new graph accommodating the new reservation as well as existing reservations in the manner discussed above in conjunction with FIGS. 3–12. In step 1406, if the attempt of step 1405 succeeded, then the scheduler continues at step 1407, else the scheduler continues at step 1411. In step 1407, the scheduler attempts to satisfy the attempt using the new scheduling graph constructed in step 1405. In step 1408, if the attempt of step 1407 succeeded, then the scheduler continues at step 1409, else the scheduler continues at step 1411. In step 1409, the scheduler accepts the new reservation accommodated by the new scheduling graph constructed in step 1405. Then, in step 1410, the scheduler utilizes the scheduling graph constructed in step 1405 and these steps conclude. In step 1411, because the scheduler was unable to provide the scheduling graph or construct a new scheduling graph accommodating the new reservation, existing reservations, and accepted constraints, the scheduler declines the new reservation. In an alternative preferred embodiment, in step 11, instead of declining the new reservation, the scheduler returns a future time after which the reservation will be granted, and creates a deferred reservation that becomes effective at that time. Then, in step 1412, the scheduler utilizes the original scheduling graph. These steps then conclude.

Figure 15:
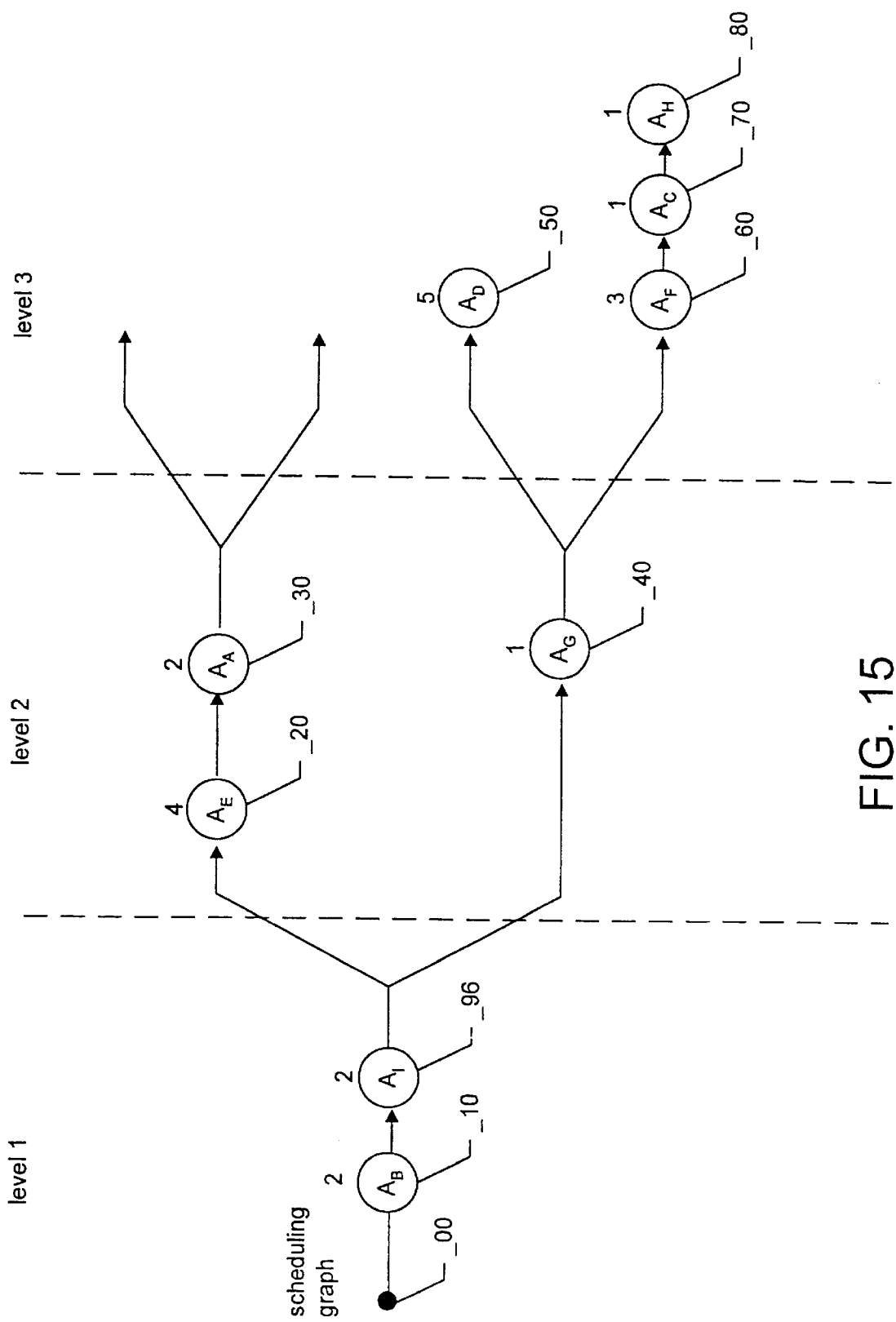
FIG. 15 is a scheduling graph diagram showing the dedication of a free node to an activity in order to accommodate a new reservation.

FIG. 15 is a scheduling graph diagram showing a modification of the existing sample scheduling graph shown in FIG. 12 to accommodate a new reservation for activity $A_I$ shown in Table 4.

TABLE 4

| Activity | Amount Reserved | Reservation Window | Fraction of Total Execution Time |
|---|---|---|---|
| $A_A$ | 2 | 20 | 10% |
| $A_B$ | 2 | 10 | 20% |
| $A_C$ | 1 | 40 | 2.5% |
| $A_D$ | 5 | 40 | 12.5% |
| $A_E$ | 6 | 30 | 20% |
| $A_F$ | 3 | 40 | 7.5% |
| $A_G$ | 1 | 20 | 5% |
| $A_H$ | 1 | 40 | 2.5% |
| $A_I$ | 2 | 10 | 20% |
| | | | 100% |

It can be seen from Table 4 that the new reservation for activity $A_I$ specifies a reservation amount of 2 time units and a reservation window length of 10 time units. The reservation window length of 10 time units places the activity in activity group 1, meaning that the scheduler will attempt to dedicate a node in the first level of the scheduling graph to activity $A_I$. Because the reservation amount is 2 time units, the scheduler will attempt to assign a free node in the first level of the scheduling graph having a weight of 2 to activity $A_I$. Because free node 1295 (FIG. 12) is in the first level of the scheduling graph and has weight 2, the scheduler preferably dedicates the free node 1296 to activity $A_I$ in order to satisfy the new reservation for activity $A_I$.

In cases in which the new reservation has a reservation amount greater than the largest weight of any free node in the level of the scheduling graph corresponding to the reservation window length specified by the new reservation, the scheduler must manipulate the scheduling graph more extensively. In such cases, the scheduler must move free nodes from other levels of the scheduling graph to the level corresponding to the reservation window length for the new reservation. In the process, the scheduler must adjust the weight of the moved free node or nodes to maintain the total weight of the root-to-leaf paths along which the free nodes are moved.

Figure 16:
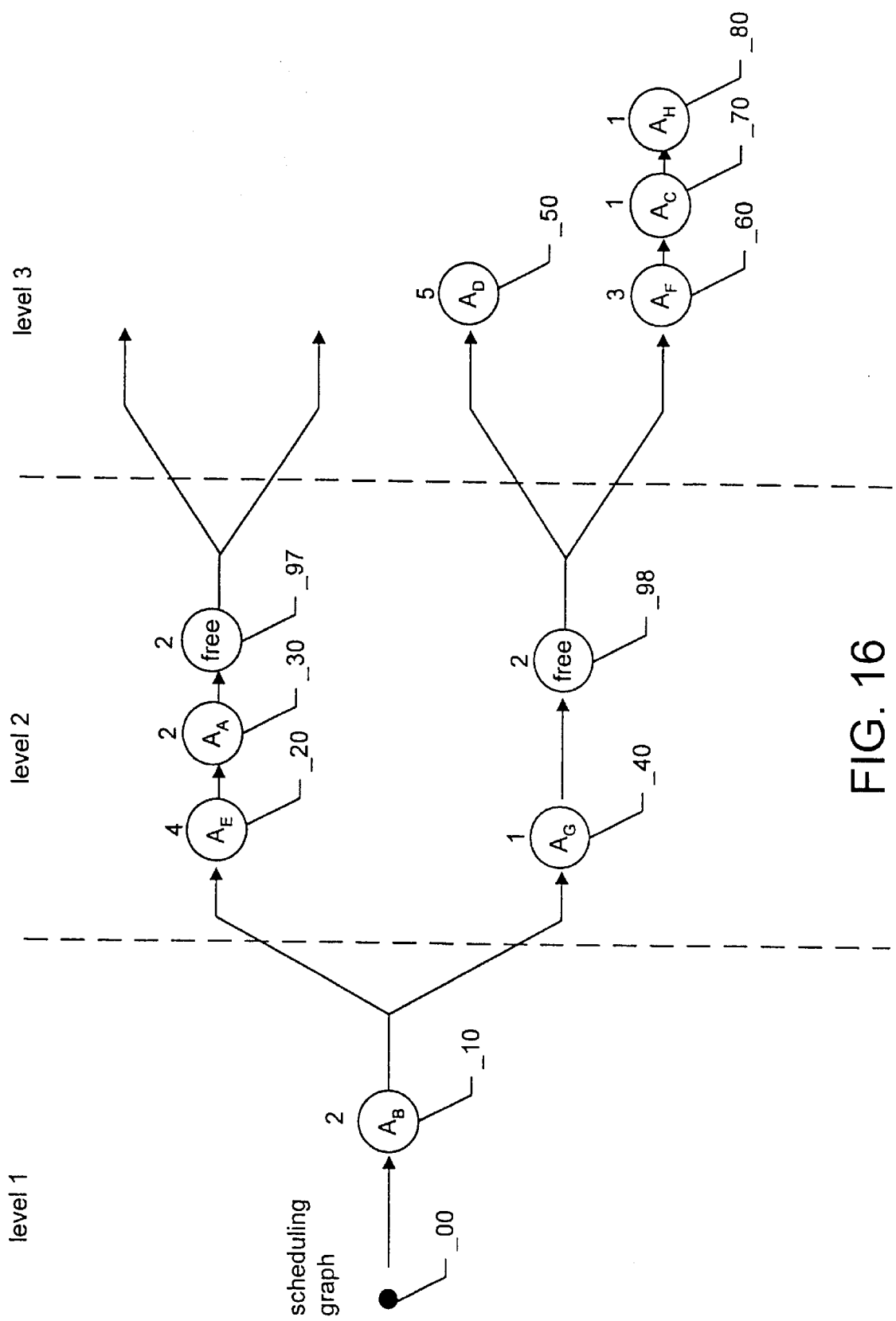
FIG. 16 is a scheduling graph diagram showing the relocation of free nodes to a different level to accommodate a new reservation.

FIG. 16 is a scheduling diagram showing the relocation of free nodes to a different level where necessary to accommodate a new reservation. As part of the example, while the scheduler is using the schedule graph shown in FIG. 12, activity $A_J$ submits a reservation as shown in Table 5.

TABLE 5

| Activity | Amount Reserved | Reservation Window | Fraction of Total Execution Time |
|---|---|---|---|
| $A_A$ | 2 | 20 | 10% |
| $A_B$ | 2 | 10 | 20% |
| $A_C$ | 1 | 40 | 2.5% |
| $A_D$ | 5 | 40 | 12.5% |
| $A_E$ | 6 | 30 | 20% |
| $A_F$ | 3 | 40 | 7.5% |
| $A_G$ | 1 | 20 | 5% |
| $A_H$ | 1 | 40 | 2.5% |
| $A_J$ | 2 | 20 | 10% |
| | | | 90% |

Because the new reservation for activity $A_J$ has a reservation window length of 20 time units, activity $A_J$ belongs to the second activity group. However, the second level of the scheduling graph shown in FIG. 12 contains no free nodes having a weight of at least 2 time units. The scheduler therefore splits free node 1295, on level 1, having a weight of 2 units (FIG. 12) into free nodes 1697 and 1698 in level 2 of the graph, each having a weight of 2 (FIG. 16).

Figure 17:
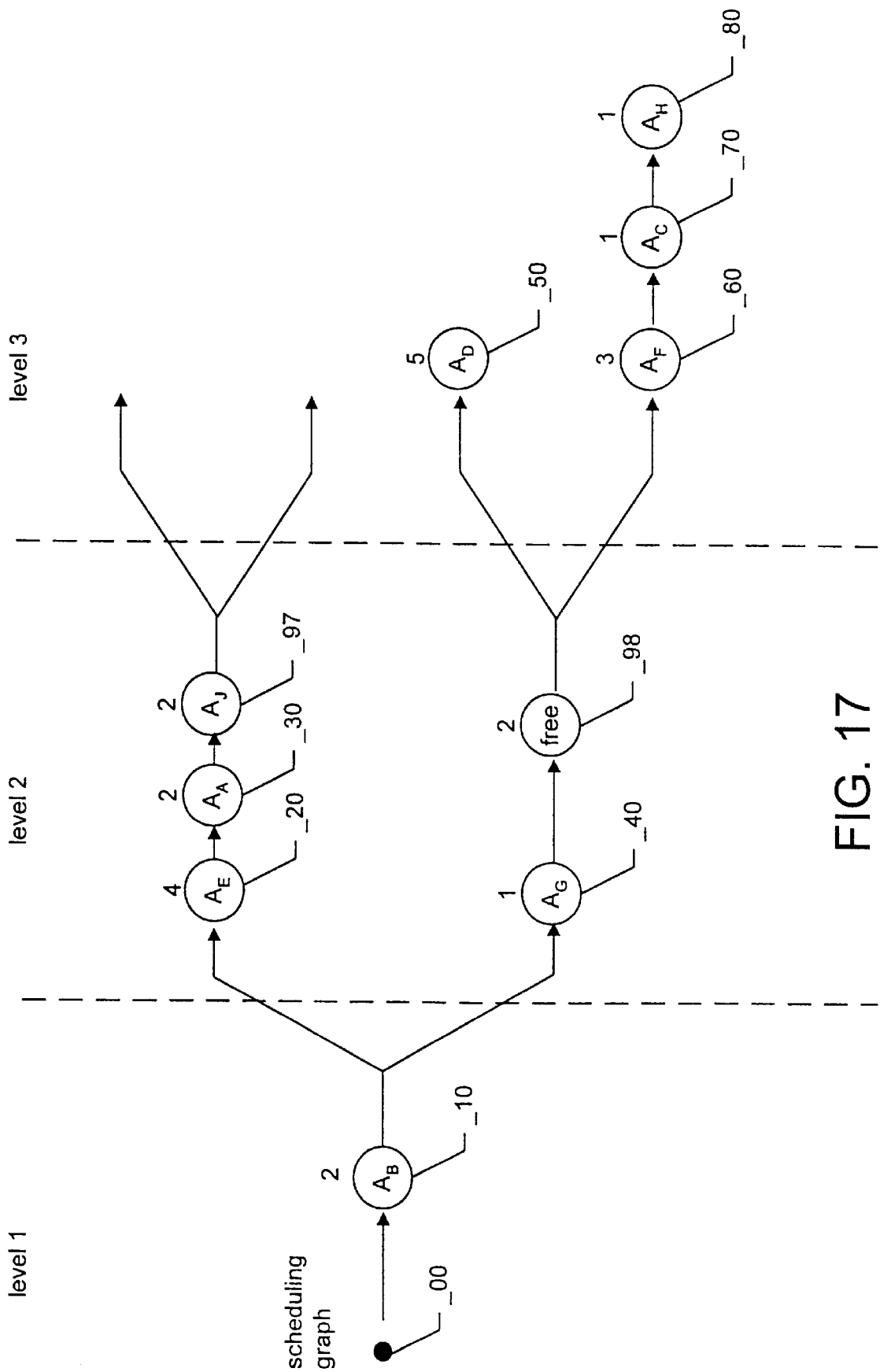
FIG. 17 is a scheduling graph diagram showing the dedication of the relocated free node to an activity in order to accommodate a new reservation.

FIG. 17 is a scheduling graph diagram showing the dedication of relocated free node 1797 to activity $A_J$ in order to accommodate the new reservation submitted by activity $A_J$. As can be seen from FIG. 17, the scheduler has thereby modified the scheduling graph to accommodate the new reservation submitted by activity $A_J$.

Figure 18:
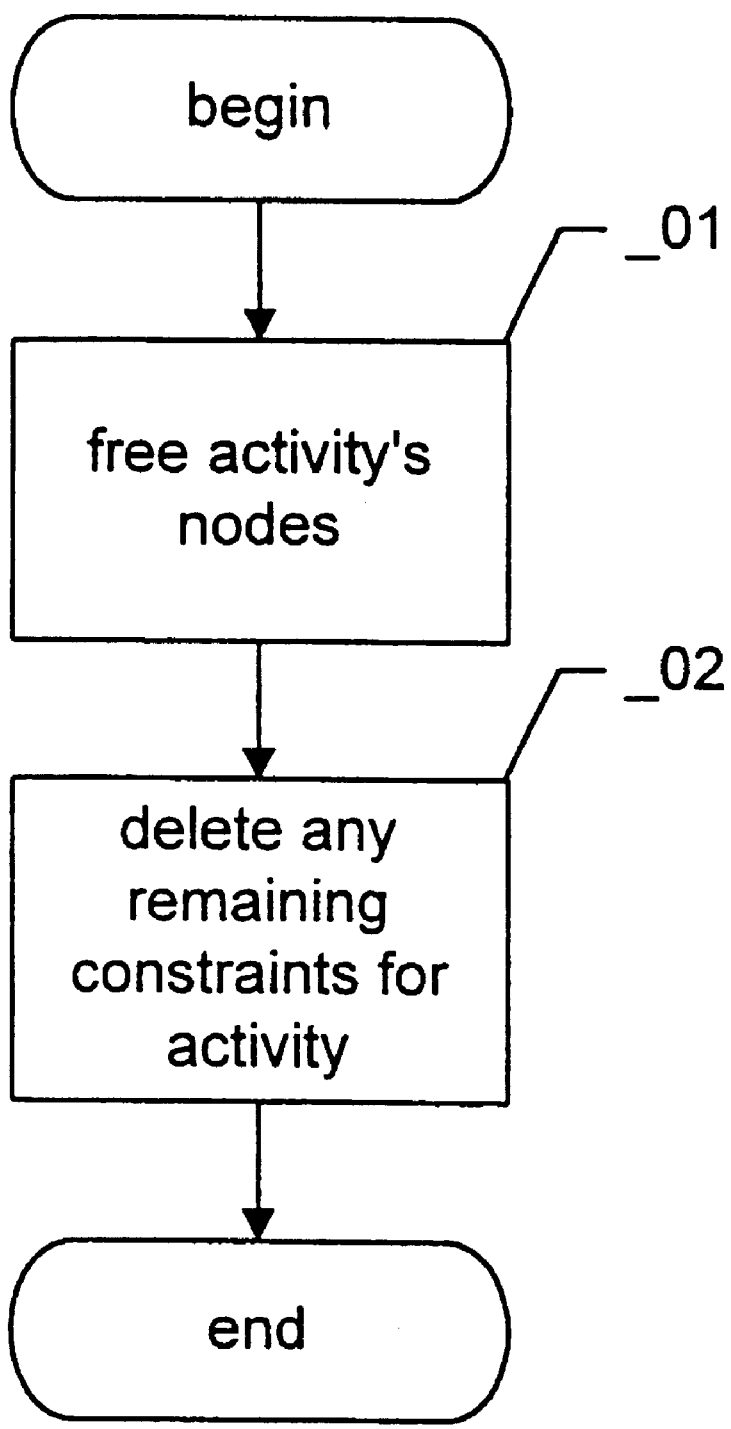
FIG. 18 is a flow diagram showing the steps preferably performed by the scheduler to end an accepted reservation.

When a reservation is ended by the activity that submitted it, the scheduler preferably modifies the existing scheduling graph by converting any nodes dedicated to the submitting activity to free nodes. FIG. 18 is a flow diagram showing the steps preferably performed by the scheduler in order to end an accepted reservation. In step 1801, the scheduler frees any nodes of the scheduling graph dedicated to the activity. In step 1802, the scheduler deletes any remaining constraints submitted by threads of the activity. These steps then conclude.

As part of the example, while the scheduler is using the scheduling graph shown in FIG. 12, activity $A_G$ ends its reservation, perhaps because activity $A_G$ is being terminated. This is shown in Table 6.

TABLE 6

| Activity | Amount Reserved | Reservation Window | Fraction of Total Execution Time |
|---|---|---|---|
| $A_A$ | 2 | 20 | 10% |
| $A_B$ | 2 | 10 | 20% |
| $A_C$ | 1 | 40 | 2.5% |
| $A_D$ | 5 | 40 | 12.5% |
| $A_E$ | 4 | 20 | 20% |
| $A_F$ | 3 | 40 | 7.5% |
| $A_H$ | 1 | 40 | 2.5% |
| | | | 75% |

Figure 19:
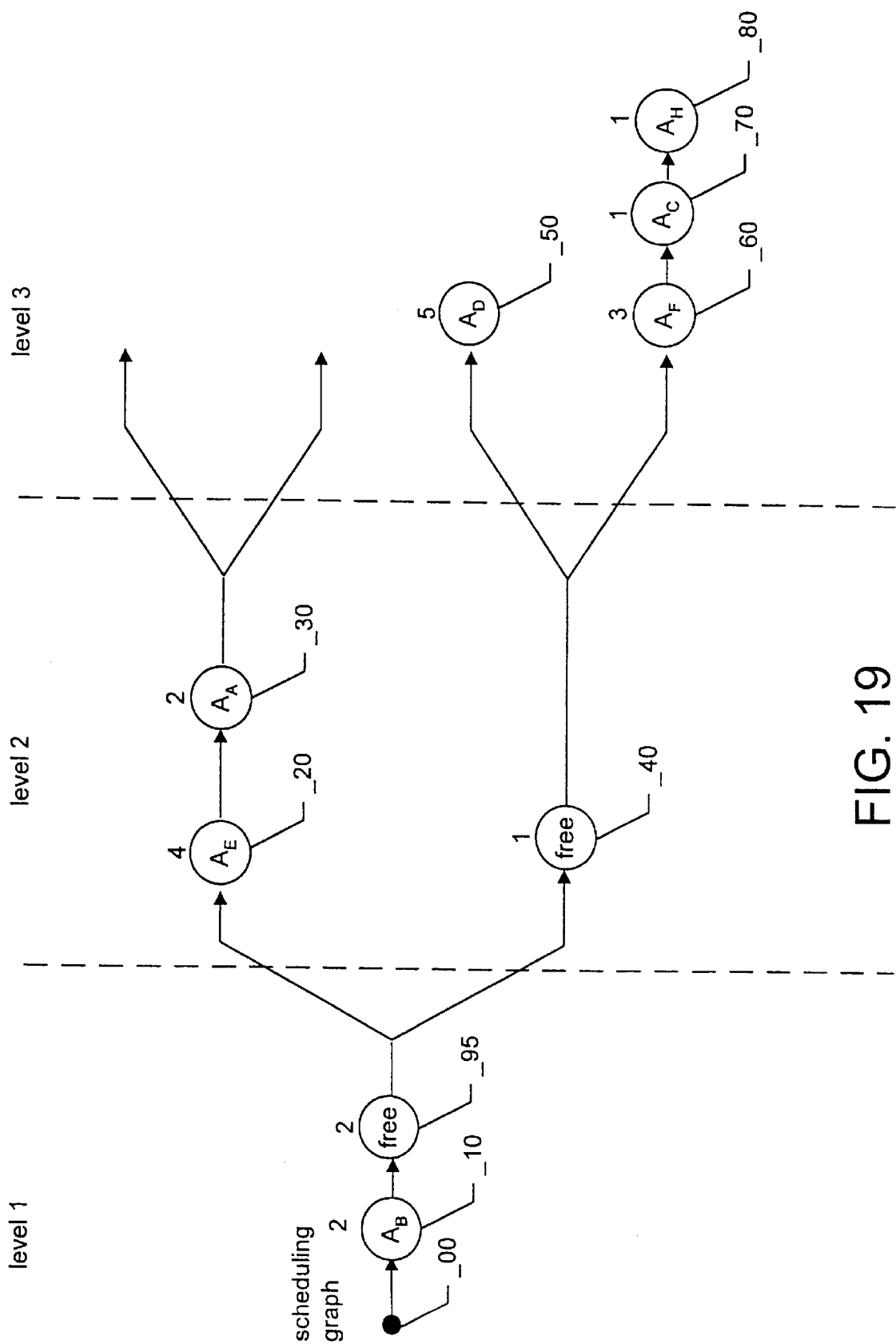
FIG. 19 is a scheduling graph diagram showing a dedicated node being freed to end an existing reservation.

FIG. 19 is a scheduling graph showing dedicated node 1240 (FIG. 12) being converted to free node 1940. Those skilled in the art will appreciate that the scheduling graph shown in FIG. 19 reflects the ending of the reservation for activity $A_G$, in that this scheduling graph contains no nodes dedicated to activity $A_G$.

The scheduling graphs shown in the foregoing figures and discussed above each exhibit an in-branching factor of 1, meaning that one edge of the graph enters each node, and an out-branching factor of 2, meaning that non-root nodes that are the last nodes of a level have two etches exiting them. Alternative embodiments of the present invention use scheduling graphs having different in-branching and out-branching factors.

Figure 20:
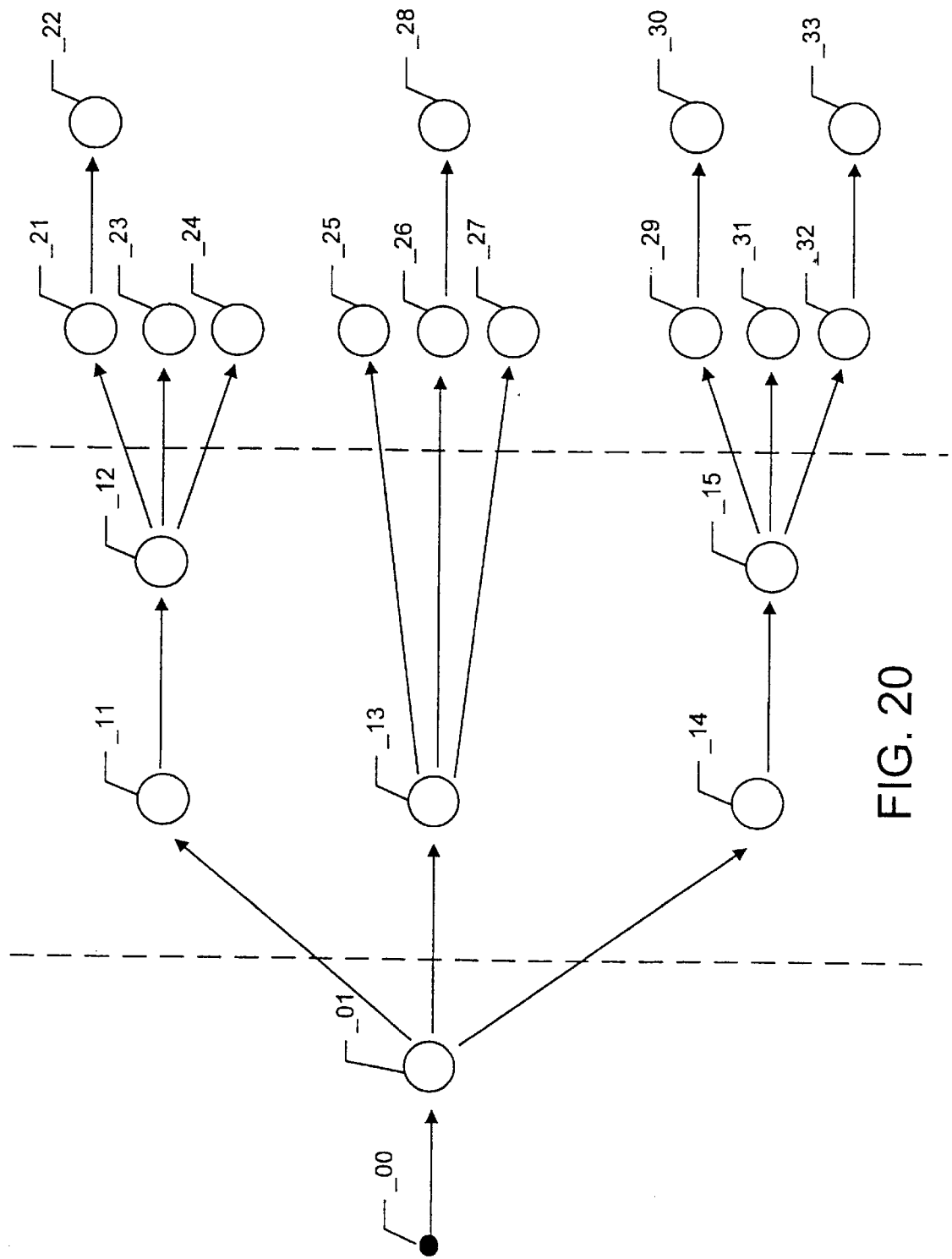
FIG. 20 is a scheduling graph diagram showing a scheduling graph having an out-branching factor of three.

FIG. 20 is a scheduling graph diagram showing the scheduling graph having an out-branching factor of 3. The scheduling graph in FIG. 20 has three levels. Level 1 includes node 2001. Level 2 includes nodes 2011, 2012, 2013, 2014, and 2015. Level 3 includes nodes 2021, 2022, 2023, 2024, 2025, 2026, 2027, 2028, 2029, 2030, 2031, 2032, and 2033. It can be seen that nodes 2001, 2012, 2013, and 2015, which are each the last node of a level and not a root node, are exited by three edges to three different nodes. It can further be seen that there are nine root-to-leaf paths in this graph. Path 1 includes nodes 2001, 2011, 2012, 2021, and 2022. Path 2 includes nodes 2001, 2011, 2012, and 2023. Path 3 contains nodes 2001, 2011, 2012, and 2024. Path 4 contains nodes 2001, 2013, and 2025. Path 5 includes nodes 2001, 2013, 2026, and 2028. Path 6 contains nodes 2001, 2013, and 2027. Path 7 contains nodes 2001, 2014, 2015, 2029, and 2030. Path 8 contains nodes 2001, 2014, 2015, and 2031. Path 9 contains nodes 2001, 2014, 2015, 2032, and 2033.

Figure 21:
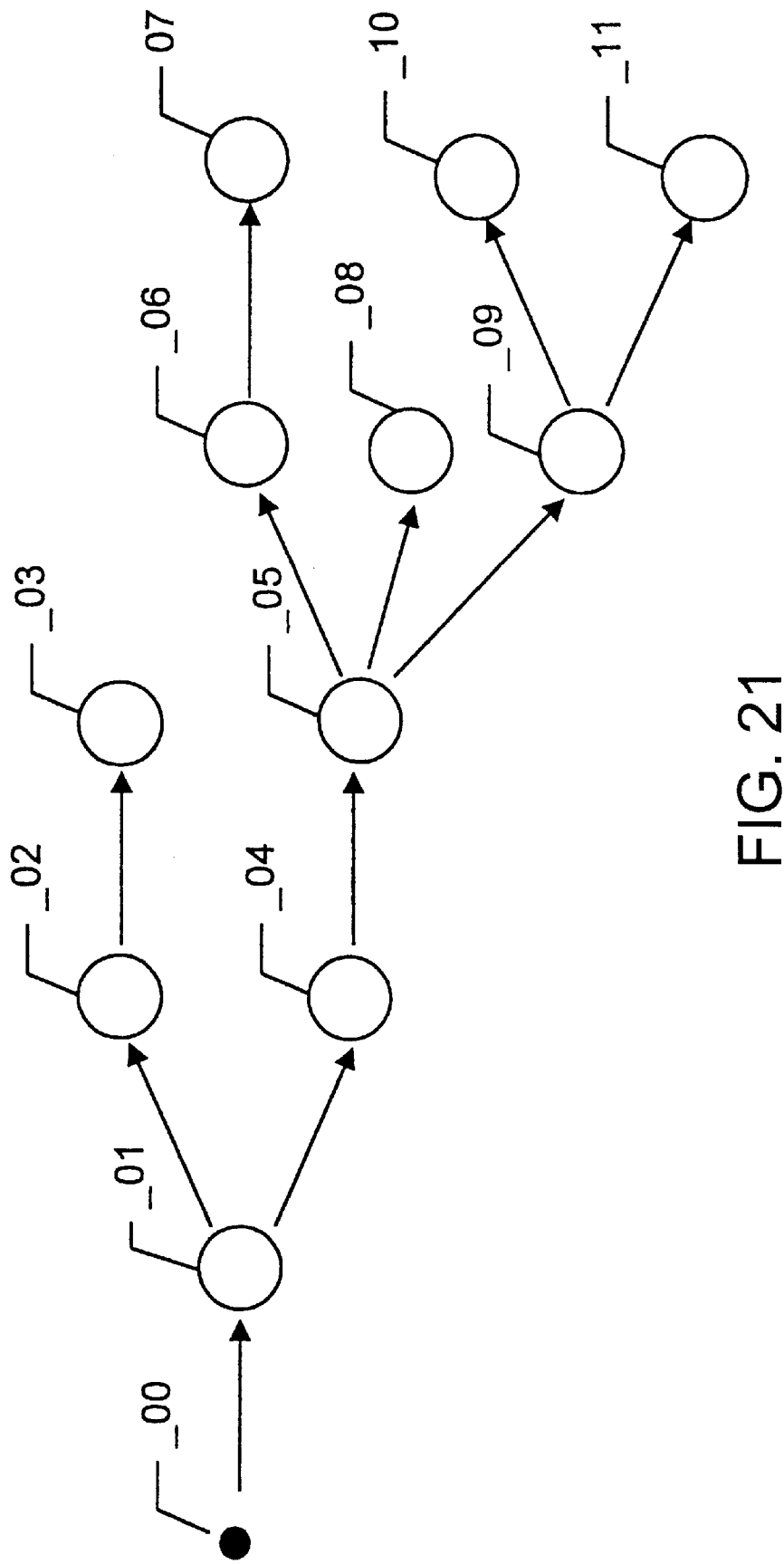
FIG. 21 is a scheduling graph diagram showing a scheduling graph having a variable out-branching factor.

FIG. 21 is a scheduling graph diagram showing a scheduling graph having a variable out-branching factor. The scheduling graph in FIG. 21 has five root-to-leaf paths. Path 1 contains nodes 2101, 2102, and 2103. Path 2 contains nodes 2101, 2104, 2105, 2106, and 2107. Path 3 contains nodes 2101, 2104, 2105, and 2108. Path 4 contains nodes 2101, 2104, 2105, 2109, and 2110. Path 5 contains nodes 2101, 2104, 2105, 2109, and 2111. It can be seen that nodes 2101 and 2109 each have two exiting edges, while node 2105 have three exiting edges. The difference in the number of exiting edges between these nodes characterizes this graph as having a variable out-branching factor. Because the graph has a variable out-branching factor, the assignment of nodes to specific levels is not possible.

Figure 22:
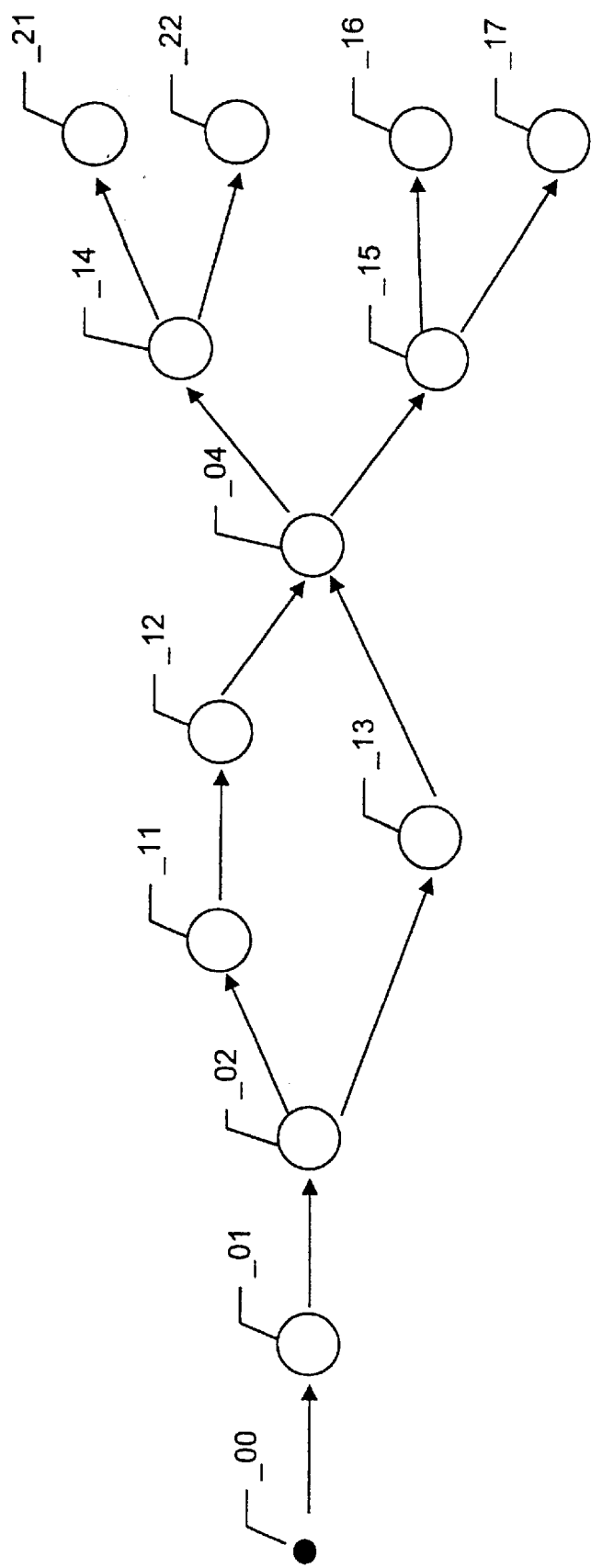
FIG. 22 is a scheduling graph diagram showing a scheduling graph exhibiting in-branching as well as out-branching.

FIG. 22 is a scheduling graph diagram showing a scheduling graph exhibiting in-branching, as well as out-branching. The scheduling graph in FIG. 22 has four root-to-leaf paths. Path 1 includes nodes 2201, 2202, 2211, 2212, 2204, 2214, and 2221. Path 2 includes nodes 2201, 2202, 2211, 2212, 2204, 2214, and 2222. Path 3 includes nodes 2201, 2202, 2213, 2204, 2215, and 2216. Path 4 includes nodes 2201, 2202, 2213, 2204, 2215, and 2217. It can be seen that node 2204 is entered by two edges from two different nodes. The scheduling graph therefore is said to exhibit in-branching. Thus, while node 2204 is further from the root of the graph than level 2 node 2211, 2212, and 2213, it is nonetheless a member of the first level, as it is included on as many paths as nodes 2201 and 2202.

Figure 23:
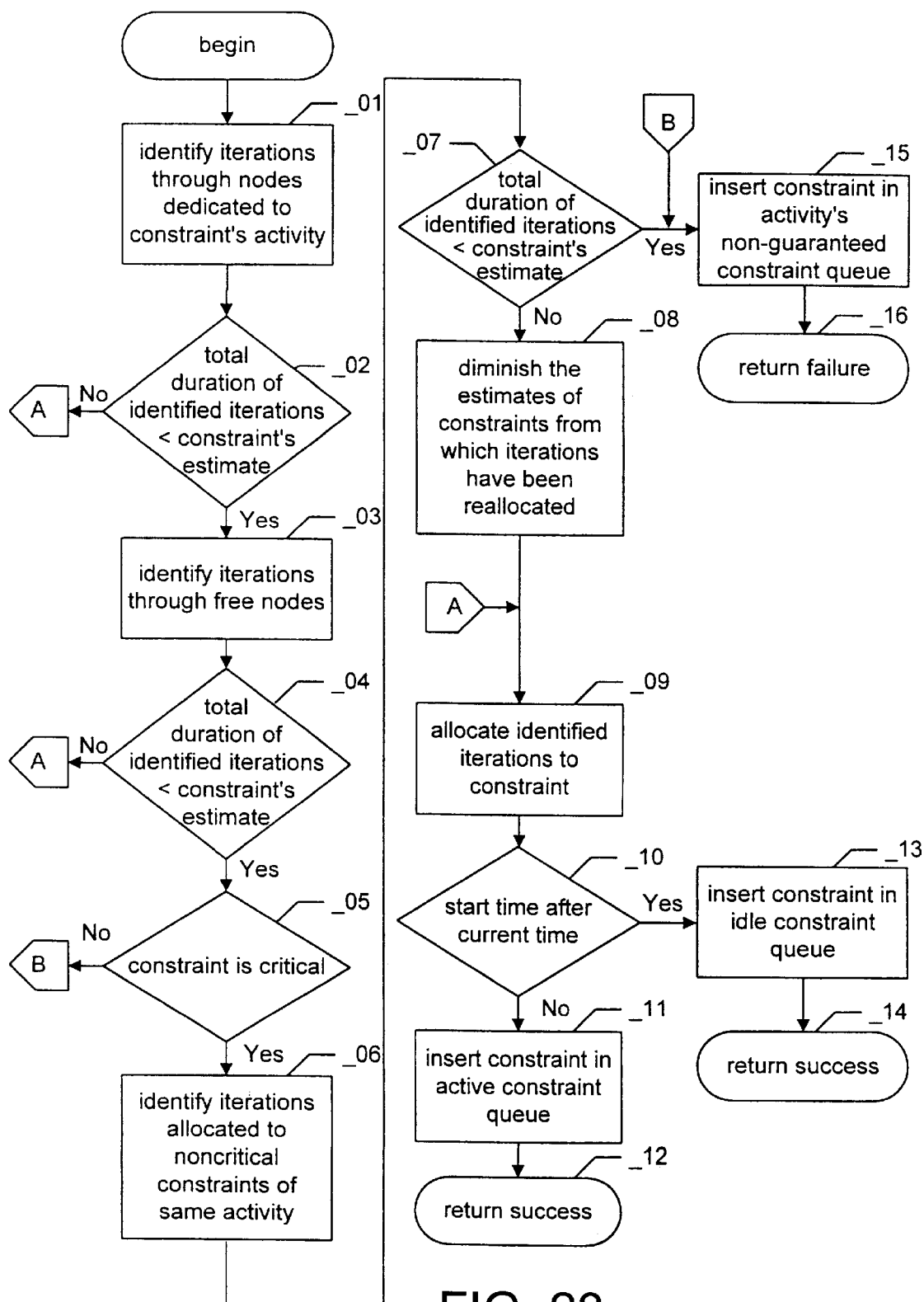
FIG. 23 is a flow diagram showing the steps preferably performed by the scheduler to process a submitted constraint.

FIG. 23 is a flow diagram showing the steps preferably performed by the scheduler to process a submitted constraint. In these steps, the scheduler identifies future iterations through scheduling graph nodes that may be allocated to the constraints; if the total duration of these identified iterations is at least as large as the execution time estimate of the constraint, then the identified intervals are allocated to the constraint and the constraint is accepted, otherwise the constraint is declined. In step 2301, the scheduler identifies unallocated future iterations through scheduling graph nodes that are dedicated to the activity to which the thread submitting the constraint belongs that are between the start time and deadline for the constraint, up to a total duration equal to the execution time estimate of the constraint. The performance of step 2301 is discussed in conjunction with FIG. 24. FIG. 24 is a scheduling graph detail diagram showing the constraints to which iterations through a sample scheduling graph node are initially dedicated. FIG. 24 shows detail of scheduling graph node 1250 (FIG. 12). It shows that, associated with the node 1250/2450 dedicated to activity $A_C$, the scheduler stores for upcoming iterations through the node an indication of the constraint to which the upcoming iteration through the node or portion thereof is allocated. For example, it can be seen from FIG. 24 that the next iteration through node 2450 at time 125 is allocated to constraint $C_{C1}$. It can also be seen that the iterations starting at times 205 through 405 have not been allocated to any constraint, and are available for allocation to constraints submitted by threads of activity $A_C$.

FIG. 25 is a scheduling graph detail diagram showing the allocation of specific traversals of the node to a new constraint. As part of the example, thread $t_{C1}$ submits the constraint shown in Table 7 while the scheduler is in the state shown in FIG. 24. It can be seen that, in accordance with step 2301, the scheduler identifies for allocation to constraint $C_{C2}$ the upcoming iterations of the node starting at times 245 through 365.

TABLE 7

| Constraint | Activity | Thread | Start Time | Deadline | Execution Time Estimate | Critical |
|---|---|---|---|---|---|---|
| $C_{C2}$ | $A_C$ | $t_{C1}$ | 235 | 495 | 4 | No |

Because the weight of the node 2550 is 1, each allocation of an iteration through the node allows the constraint to which it is allocated to execute for 1 time unit. Therefore, the allocation of four iterations through the node will enable constraint $C_{C2}$ to execute for its entire estimate of 4 time units. Further, these iterations are between the start time and the deadline. For these reasons, if the constraint $C_{C2}$ is executed in accordance with these allocations, constraints $C_{C2}$ will be successfully completed. It should be noted that iterations in nodes need not be selected in their entirety for allocation to a constraint. Rather, in steps 2301, 2303, and 2306, the facility may select only a portion of the duration of the iterations for a node for assignment to the submitted constraint. The remainder of the duration of the iteration through the node remains allocated in any manner it was previously.

Returning to FIG. 23, in step 2302, if the total duration of the intervals identified in step 2301 is less than the execution time estimate specified by the constraint, then the scheduler continues at step 2303, else the scheduler continues at step 2309. In step 2303, the scheduler identifies unallocated future iterations through free nodes in the same manner discussed above in conjunction with step 2301. In step 2304, if the total duration of the intervals identified in steps 2301 and 2303 is less than the execution time estimate specified by the constraint, then the scheduler continues at step 2305, else the scheduler continues at step 2309. If the submitted constraint is critical, then the scheduler continues at step 2306, else the scheduler continues to step 2315.

The example includes the receipt of the critical constraint shown in Table 8 while the scheduler is in the state shown in FIG. 25. In step 2306, the scheduler identifies iterations through nodes that have been allocated to non-critical constraints of the same activity.

TABLE 8

| Constraint | Activity | Thread | Start Time | Deadline | Execution Time Estimate | Critical |
|---|---|---|---|---|---|---|
| $C_{C3}$ | $A_C$ | $t_{C3}$ | 200 | 400 | 5 | Yes |

FIG. 26 is a scheduling graph detail diagram showing the reallocation of specific traversals through a node to the critical constraint. FIG. 26 shows the identification of iterations occurring at times 245 through 365 previously allocated to non-critical constraint $C_{C2}$ for reallocation to critical constraint $C_{C3}$ in accordance with step 2306.

Returning to FIG. 23, in step 2307, if the total duration of the iterations identified in steps 2301, 2303, and 2306 are less than the execution time estimate specified by the submitting constraint, then the scheduler continues in step 2315, else the scheduler continues in step 2308. In step 2308, for each constraint from which iterations were identified for reallocation to the submitted constraint in step 2306, the scheduler reduces the estimate of the constraint by the total duration of the intervals identified for reallocation to the submitted constraint from the constraint in 2306. This process of reassigning intervals already allocated to non-critical constraints of the same activity allows critical constraints to be accepted and satisfied in situations in which they otherwise could not be. The corresponding reduction in the estimates of the constraints from which intervals are reallocated causes these constraints to exhaust their estimates earlier than expected and be moved to the non-guaranteed queues for their activities to be completed at a priority level inferior to active constraints, but superior to threads on the circular thread queues for each activity.

Figure 27:
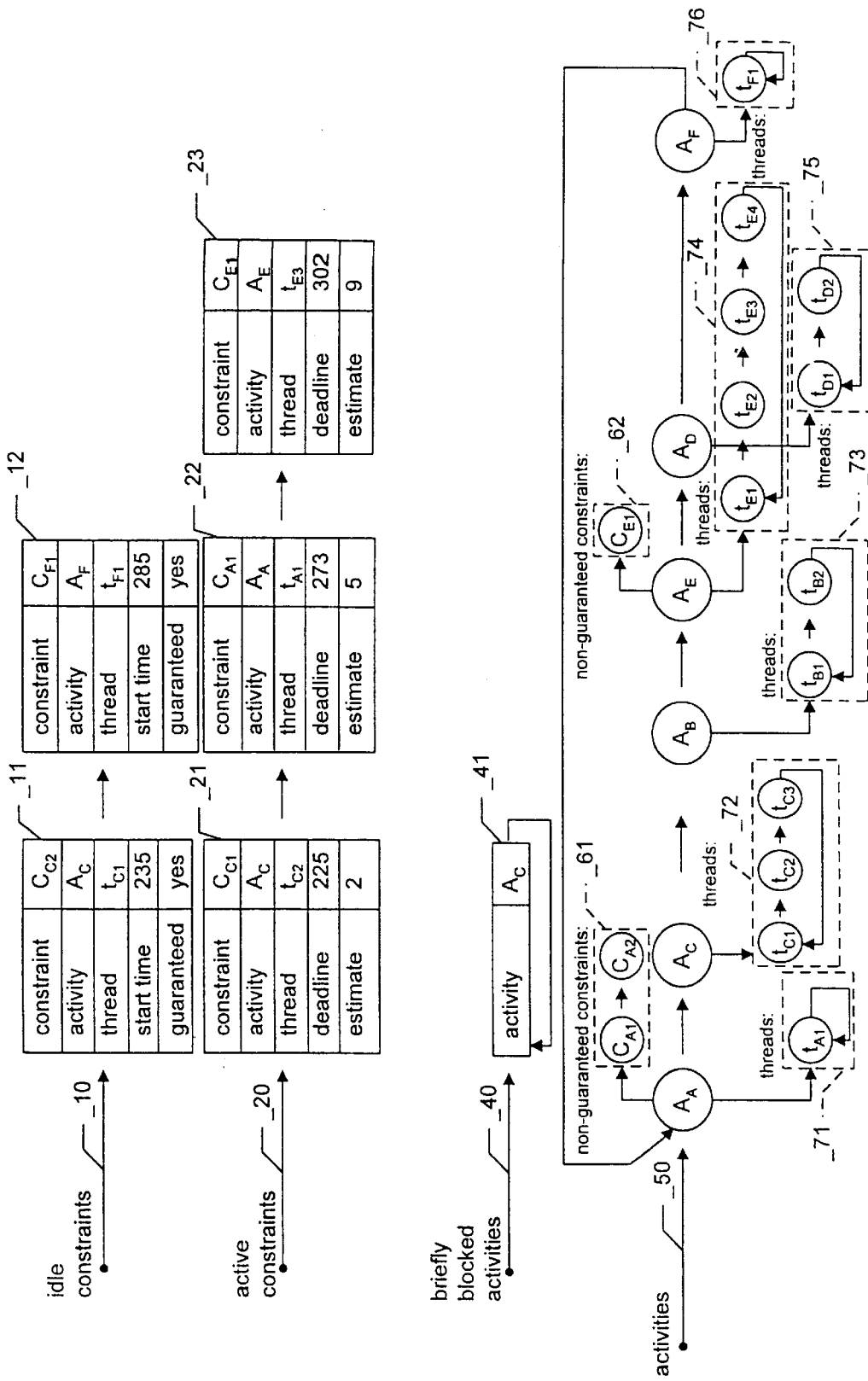
FIG. 27 is a scheduling data structure diagram showing the queues used by the scheduler to maintain the current scheduling state.

FIG. 27 is a scheduling data structure diagram showing the queues used by the current scheduling state. The diagram shows a number of queues each containing activities and constraints that will eventually be executed. An idle constraint queue 2710 contains constraint records 2711 and 2712. The idle constraint queue 2710 contains constraint records for constraints that have been accepted, but whose start time is in the future. The constraint records in the idle constraint queue 2710 are sorted by start time so that the earliest start time resides at the head of idle constraints queue. An active constraints queue 2720 contains constraint records 2721, 2722, and 2723. The constraint records in the active constraint queue 2720 contain records for constraints whose start times have passed, and are therefore "active." The constraints on the active constraint queue are those that have a remaining execution time estimate greater than zero—any threads that have exhausted their execution time estimate have been moved to a non-guaranteed constraint list for their activity, as discussed below. The constraint records in the active constraint queue 2720 are sorted by deadline so that the earliest deadline resides at the head of the queue. A round-robin activity queue 2750 is a circular list of all of the activities known to the scheduler. The round-robin activity queue 2750 preferably contains both programs that have submitted reservations and programs, such as non-real-time programs, that have not submitted reservations. Each activity in the list has an ordered list of non-guaranteed constraints submitted by its threads (e.g., non-guaranteed constraint 2761 of activity $A_A$), which may include constraints not initially accepted by the scheduler and constraints that were accepted by the scheduler but whose execution time estimate was exhausted before the submitting thread requested that the scheduler end the constraint. Each activity in the round-robin activity queue further has a circular list of threads of the activity (e.g., threads 2774 of activity $A_B$). A briefly blocked activity queue 2740 contains activity records for activities whose threads have all blocked for a short period of time, and that have been unblocked. These activities have an execution priority that is inferior to the execution of guaranteed constraints, but that is superior to the execution of activities in the round-robin activity queue. The use of the queues shown in FIG. 27 to reassign the processor when it becomes available are discussed in detail below in conjunction with FIGS. 29–34.

Figure 28:
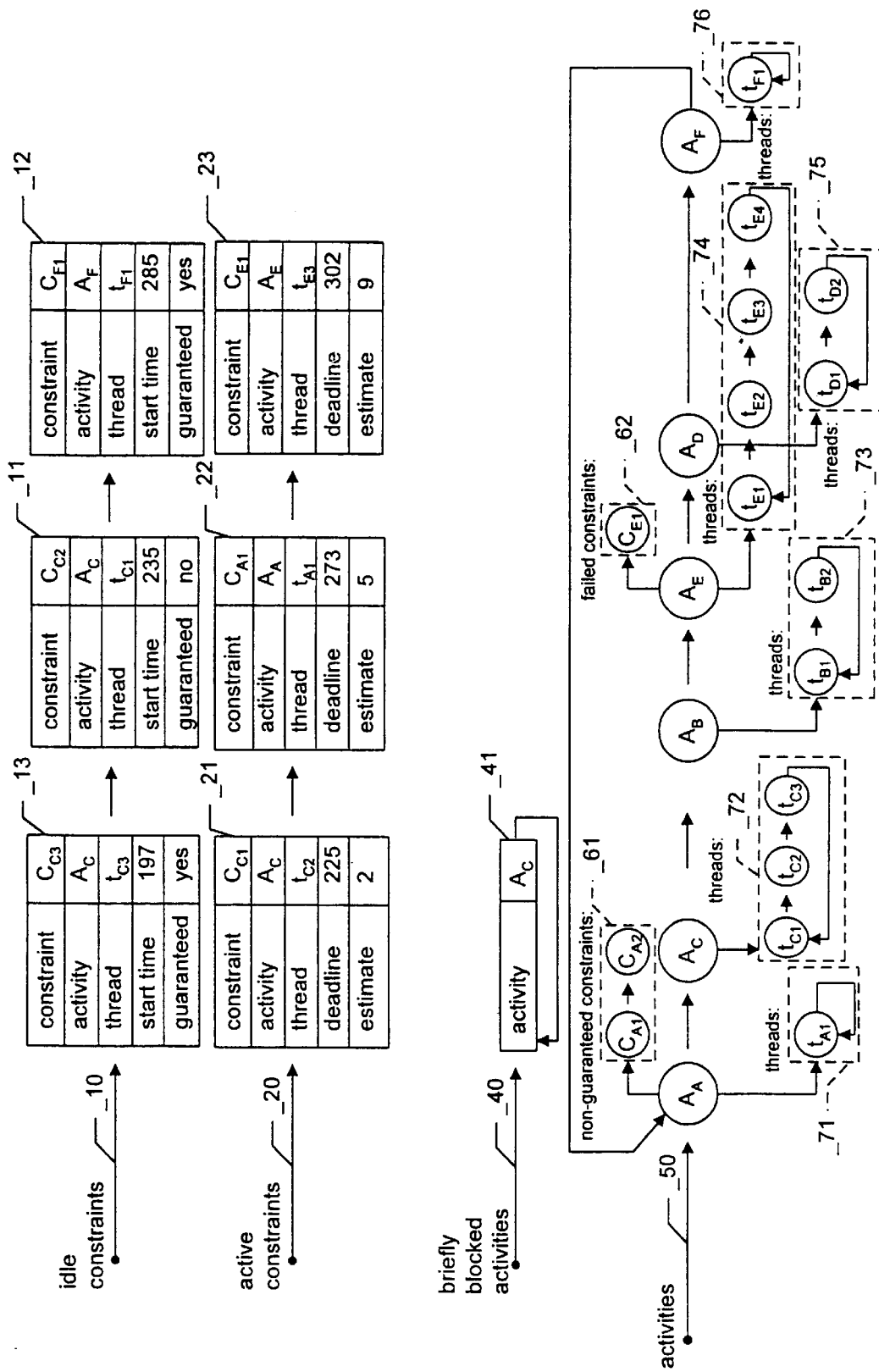
FIG. 28 is a scheduling data structure diagram showing the queues used by the scheduler to maintain the current scheduling state after accepting an urgent constraint.

It can be seen from FIG. 27 that constraint record 2711 for constraint $C_{C2}$ reflects that constraint $C_{C2}$ is guaranteed. However, in accordance with step 2307 (FIG. 23), because iterations through a scheduling graph node were reassigned to constraint $C_{C2}$ as shown in FIG. 26, the scheduler changes the guaranteed state of constraint $C_{C2}$ from "yes" to "no." It can be seen from FIG. 28 that record 2811 for constraint $C_{C2}$ has been altered to change the guaranteed status of constraint $C_{C2}$ to "no" in accordance with step 2307 (FIG. 23).

Returning to FIG. 23, in step 2309, the scheduler allocates to a submitted constraint the iterations through nodes identified in steps 2301, 2303, and 2306. In step 2310, if the start time specified by the submitted constraint is after the current time, then the scheduler continues in step 2314, else the scheduler continues in step 2311. In step 2311, the scheduler inserts the submitted constraint in the active constraint queue 2720. Then, in step 2312, the scheduler returns success, indicating that it has accepted the constraint and the steps conclude. In step 2313, as the start time specified by the submitting constraint is after the current time, the submitted constraint is presently idle, so the scheduler inserts the submitting constraint in the idle constraint queue 2710. It can be seen from FIG. 27 that, in accordance with step 2313, the scheduler has inserted constraint record 2713 for submitted constraint $C_{C3}$ at the head of the idle constraints queue 2710. Then, in step 2314, the scheduler returns success indicating that the constraint has been accepted, and these steps conclude. In step 2315, as the total allocations for the submitted constraint fall short of the execution time estimate specified in the submitted constraint, the scheduler inserts the constraint in the non-guaranteed constraint queue for the activity submitting the constraint. Then, in step 2316, the scheduler returns failure indicating that the submitted constraint was not accepted, and these steps conclude.

Figure 29:
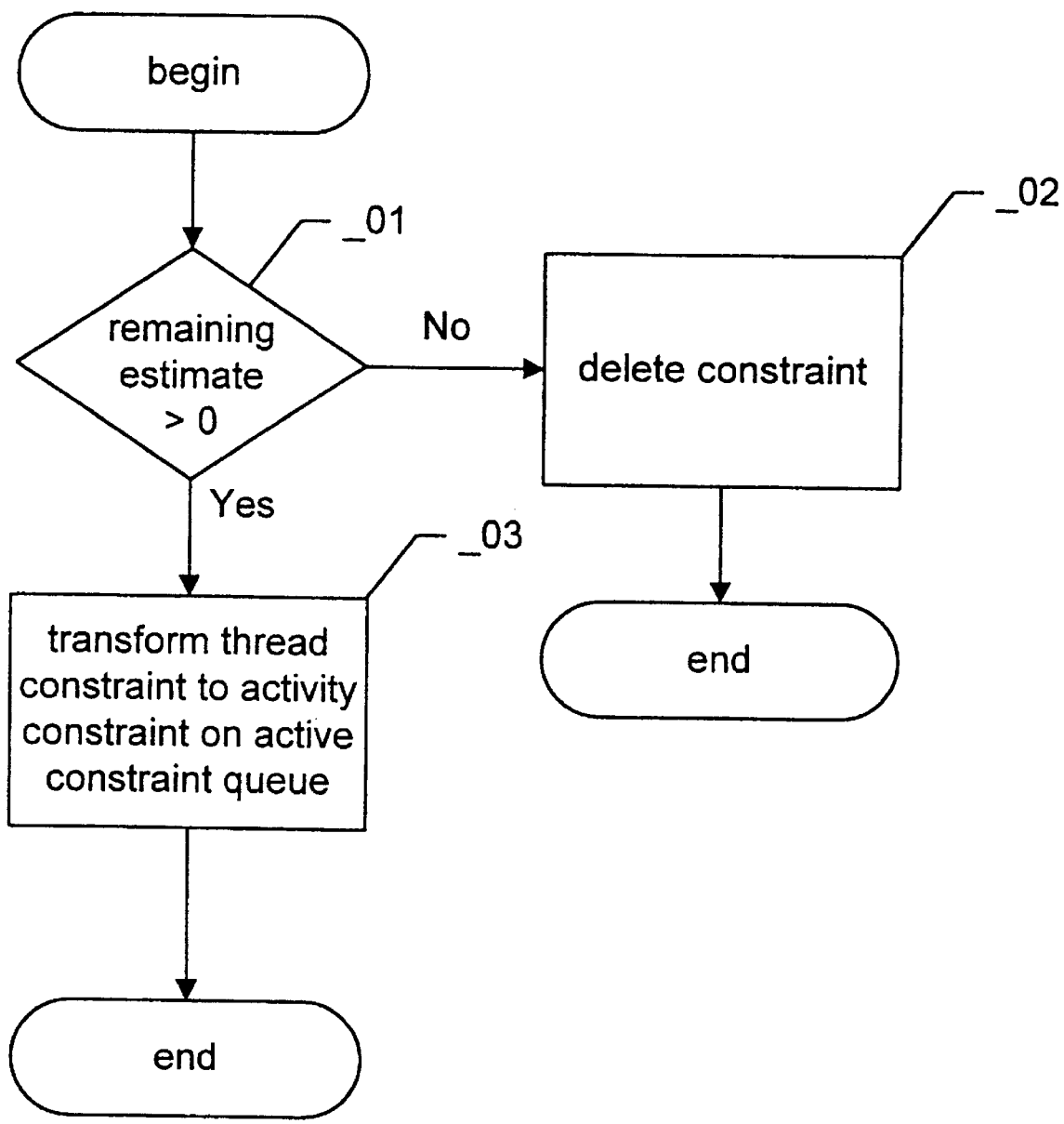
FIG. 29 is a flow diagram showing the steps preferably performed by the scheduler to end an accepted constraint.

FIG. 29 is flow diagram showing the steps preferably performed by the scheduler to end an accepted constraint in response to a request to end the constraint received from the thread that submitted the constraint. Each time a constraint is executed, the execution time estimate for the constraint is reduced by the amount of time for which the constraint was executed. In step 2901, if that remaining estimate for the ended constraint is positive, then the scheduler continues that step 2903, else the scheduler continues at step 2902. In step 2902, as the constraint has no remaining positive estimate, the scheduler deletes the constraint and these steps conclude. In step 2903, as a portion of the estimate specified by the constraint remains even though the constraint has been completed, the scheduler transforms the ended thread constraint into an activity constraint on the active constraint queue. Iterations through nodes allocated to an activity constraint are used by any of the activity's threads, which will collectively receive the remaining estimate of the constraint by the constraint's deadline. This enables the activity to use all of its reserved execution time, even if the size of the constraint for which the execution was reserved was overestimated by the submitting thread. Step 2903 permits the remaining portion of the execution time estimate to be utilized by any thread of the activity submitting the constraint. These steps then conclude.

A thread for which a constraint is already pending may submit a further constraint, called a "nested constraint." A thread generally uses nested constraints to express special execution expectations for subtasks of the task corresponding to the already-pending constraint. A nested constraint preferably temporarily replaces the already-pending constraint, whether it is in the active constraints list or the non-guaranteed constraints list for the activity to which the submitting thread belongs. When replacing the already-pending constraint with the nested constraint, the scheduler transfers any portion of the execution time estimate of the already-pending constraint between the start time and deadline of the nested constraint to the execution time estimate of the nested constraint, up to the amount of time specified for the nested constraint by the submitting thread. If the portion of the execution time estimate transferred from the already-pending constraint is less than the amount of time specified for the nested constraint by the submitting thread, the scheduler allocates additional iterations through free nodes and nodes dedicated to the activity to which the submitting thread belongs between the start time and deadline of the nested constraint, if possible. (If the requested constraint is critical, the scheduler also reallocates iterations through nodes allocated to non-critical constraints of the same activity, if necessary.) When the schedule thereafter selects the nested constraint for execution, it executes the submitting thread, and subtracts the time that the submitting thread is executed from the execution time estimate for the nested constraint. When the submitting thread submits a request to the scheduler to end the nested constraint, the scheduler replaces the nested constraint with the original constraint, and transfers any execution time estimate remaining in the nested constraint back to the original constraint. Constraints may be successively nested—that is, when a thread is executing under a nested constraint and submits a new constraint, the scheduler replaces the pending nested constraint with the new constraint in the same manner.

Figure 30:
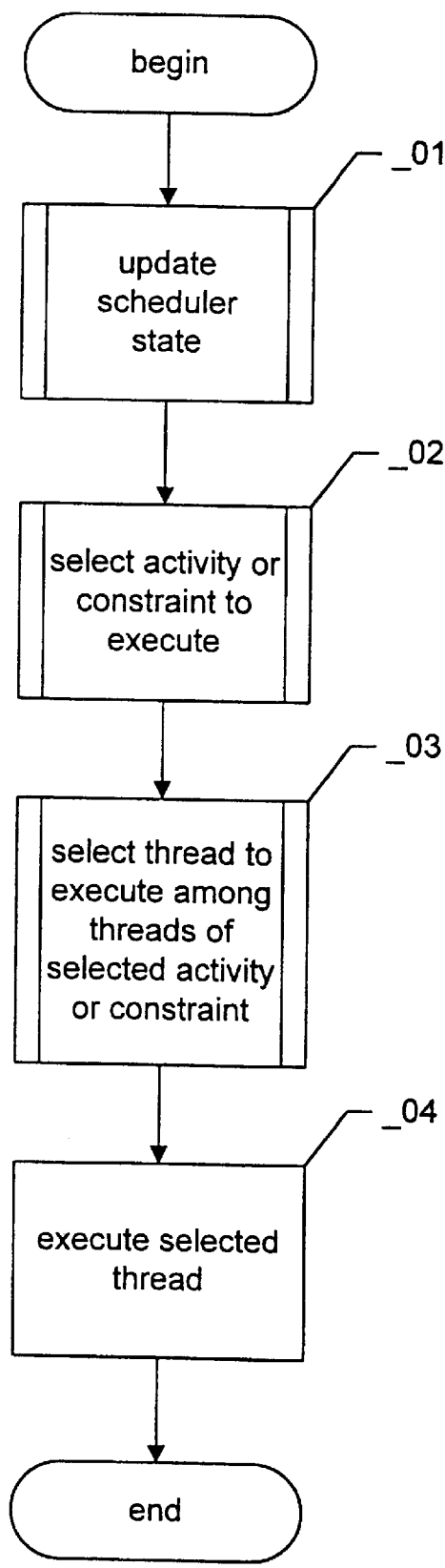
FIG. 30 is an overview flow diagram showing the steps preferably performed by the scheduler to reassign the processor to a new thread, i.e., execute a new thread, when the processor becomes available.

FIG. 30 is an overview flow diagram showing the steps preferably performed by the scheduler to reassign the processor to, or execute, a new thread when the processor becomes available. In step 3001, the scheduler updates its state to reflect current execute conditions within the computer system. The performance of step 3001 is discussed below in detail in conjunction with FIG. 31. In step 3002, the scheduler selects an activity or constraint to execute. The performance of step 3002 is discussed in detail below in conjunction with FIG. 32. In step 3003, the scheduler selects a thread to execute among the threads of the selected activity or constraint. The performance of step 3003 is discussed below in conjunction with FIG. 34. In step 3004, the scheduler executes the thread selected in step 3003. These steps then conclude.

Figure 31:
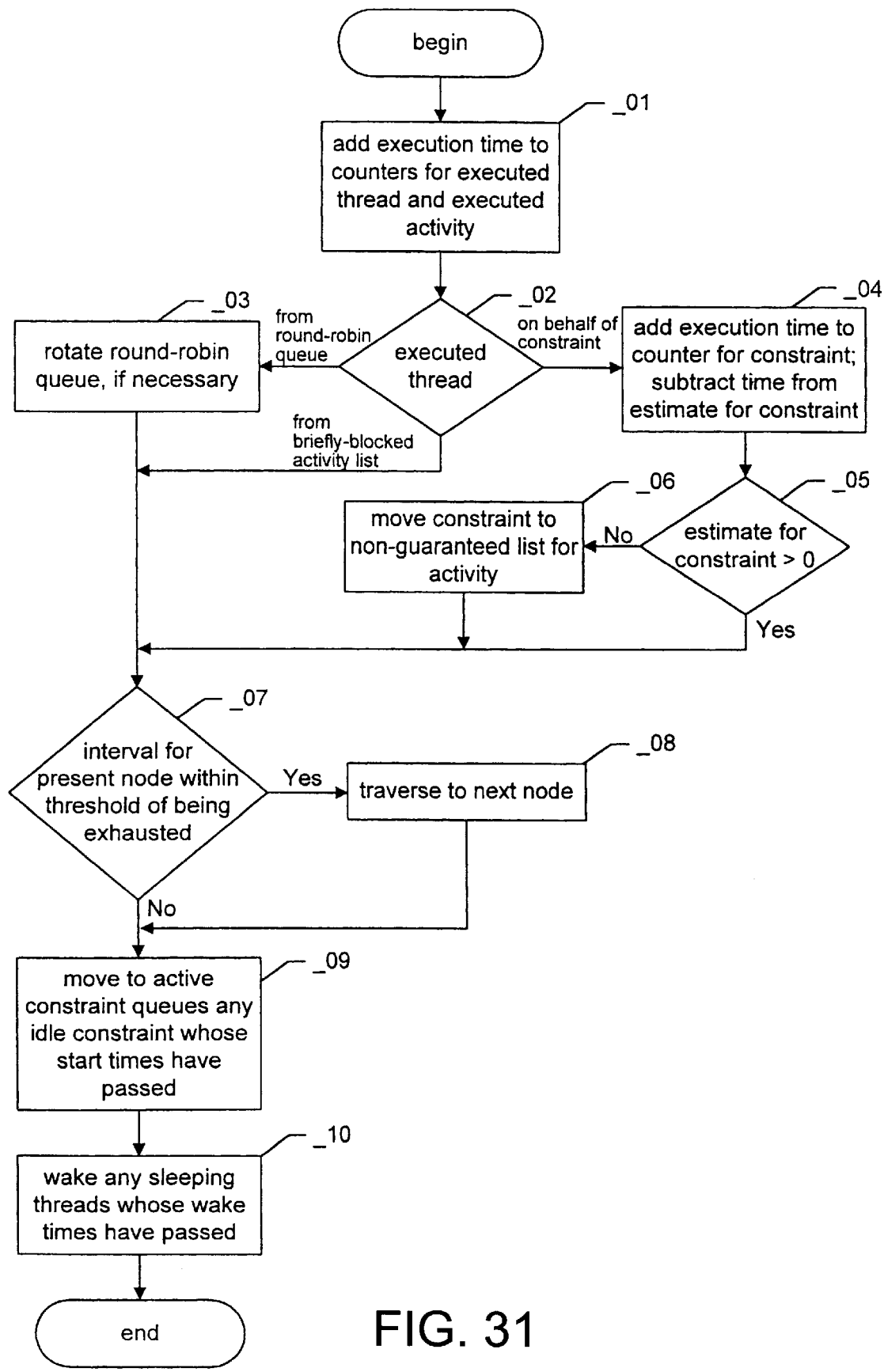
FIG. 31 is a flow diagram showing the steps preferably performed by the scheduler to update the current scheduling state before reassigning the processor to a new thread.

FIG. 31 is a flow diagram showing the steps preferably performed by the scheduler to update the current scheduling state before reassigning the processor to a new thread. Steps 3101–3107 involve updating the current scheduling state to reflect the execution of the thread whose execution was just concluded. In step 3101, the scheduler adds the amount of time for which the last-executed thread was executed to execution time counters for both the executed thread and the activity to which it belongs. In step 3102, if the last-executed thread was executed from the head of the round-robin queue 2750 (FIG. 27), then the scheduler continues at step 3103, else if the last-executed thread was executed on behalf of a constraint, then the scheduler continues at step 3104, else the last-executed thread was executed from the briefly-blocked activity list and the scheduler continues at step 3107. In step 3103, the scheduler rotates the round-robin queue, if necessary. A standard allotment is preferably specified for the round-robin queue, indicating the amount of time for which threads of the activity at the head of the round-robin queue should be executed before the activity at the head of the round-robin queue is rotated to the tail of the round-robin queue. In step 3103, if threads of the activity at the head of the round-robin queue have executed for at least the standard allotment, the scheduler rotates the activity from the head of the round-robin queue to the end of the round-robin queue. Further, if the last-executed thread was selected from the head of the activity's thread list rather than its non-guaranteed constraint list, the thread at the head of the activity's thread list is rotated to the tail of the activity's thread list. After step 3103, the scheduler continues at step 3107.

In step 3104, the scheduler adds the execution time to an execution time counter for the constraint and subtracts the execution time from the execution time estimate for the constraint. In step 3105, if, after subtracting the execution time from the execution time estimate for the constraint in step 3104, the execution time for the constraint is greater than zero, then the scheduler continues at step 3107, else the scheduler continues at step 3106. In step 3106, because the constraint has exhausted its execution time estimate, the scheduler moves the constraint from the active constraint list to the non-guaranteed constraint list for the activity. In step 3106, if the constraint is an activity constraint into which a thread constraint was converted when the submitting thread requested that the constraint be completed before its estimate was exhausted, the constraint is destroyed instead of being moved to the non-guaranteed constraint list (not shown). In the non-guaranteed constraint list for the activity, the constraint will have a lower execution priority than it did on the active constraint list, but will have a higher execution priority than threads on the circular list of threads for the activity. In step 3107, if the interval for the present node in the scheduling graph is within a minimum time threshold of being exhausted, then the scheduler continues at step 3108, else the scheduler continues at step 3109. The minimum time threshold is determined using the time cost of a context switch, as well as the time cost of the steps for assigning the processor to a new thread shown in FIG. 30. In step 3108, because at least a minimum time slice does not remain in the current iteration through the present node of the scheduling graph, the scheduler traverses to the next node in the scheduling graph in the root-to-leaf traversal of the scheduling graph. If the present node of the scheduling graph is not a leaf node, step 3108 involves moving to the next node in the present root-to-leaf path. If the present node is a leaf node, step 3108 involves returning to the root of the scheduling graph to traverse to the first node of the next root-to-leaf path. If the present root-to-leaf path is the last one in the scheduling graph, the scheduler preferably returns to the root of the scheduling graph and traverses to the first node of the first root-to-leaf path to begin a new complete traversal of the scheduling graph. In step 3109, the scheduler moves to the active constraint queue 2720 (FIG. 27) any constraints in idle constraint queue 2710 whose start times are earlier than the current time. In step 3110 the scheduler wakes any sleeping threads whose wake times are earlier than the current time. These steps then conclude.

Figure 32:
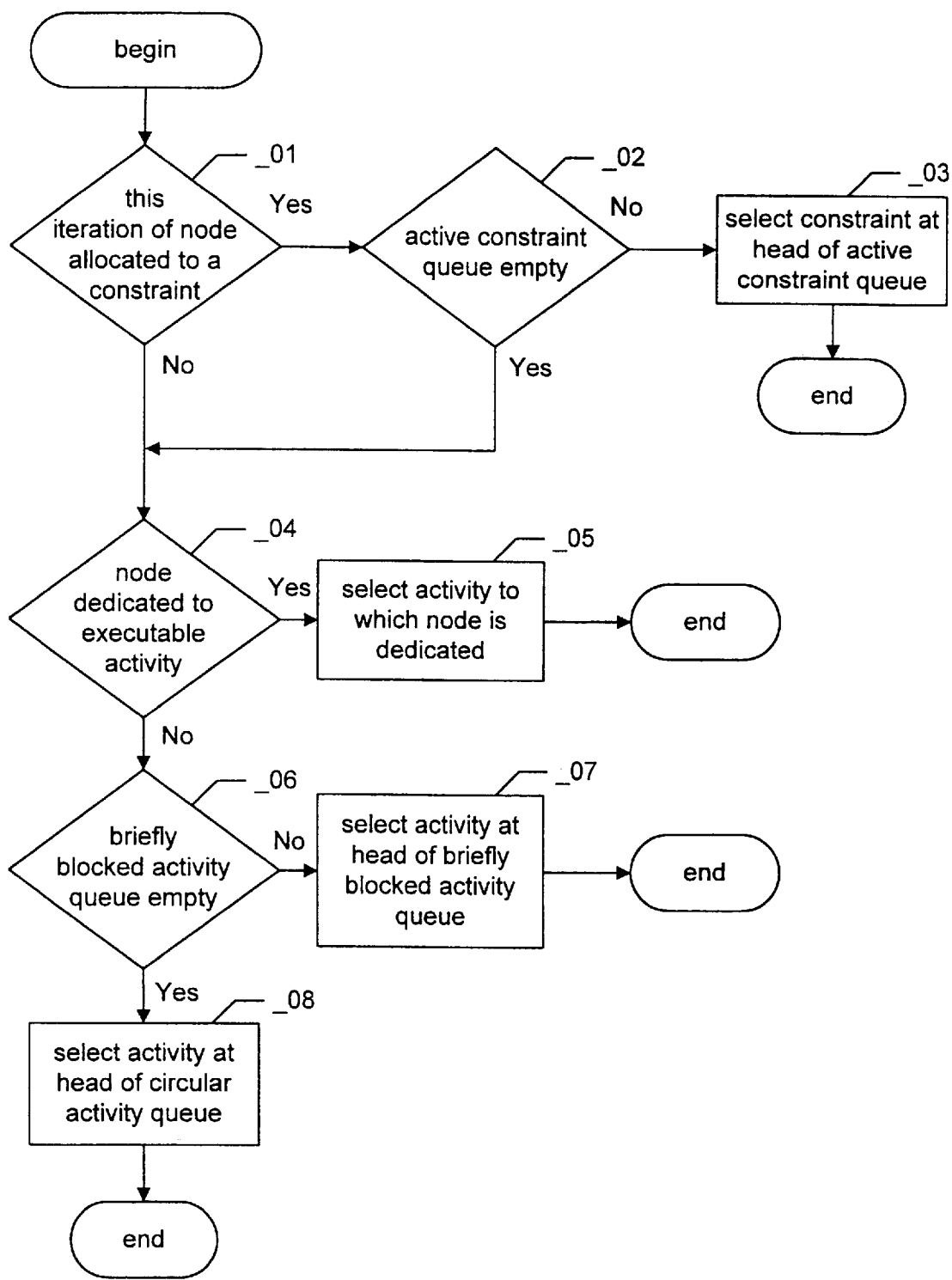
FIG. 32 is a flow diagram showing the steps preferably performed by the scheduler to select a constraint or activity to execute.

FIG. 32 is a flow diagram showing the steps preferably performed by the scheduler to select a constraint or activity to execute. Briefly, this involves selecting the first constraint or activity in the following list that exists: the constraint at the head of the active constraint queue, the activity to which the present node is dedicated, the activity at the head of the briefly blocked activity queue, and the activity at the head of the circular activity queue. In step 3201, if the present node iteration is allocated to a constraint, then the scheduler continues in step 3202, else the scheduler continues in step 3204. In step 3202, if the active constraint queue is empty, then the scheduler continues at step 3204, else the scheduler continues at step 3203. In step 3203, as there are constraints on the active constraint queue, the scheduler selects the constraint at the head of the active constraint queue for execution, and these steps conclude. In step 3204, if the present scheduling graph node is dedicated to an executable activity having at least one unblocked thread, then the scheduler continues at step 3205, else the schedule continues with step 3206. In step 3205, the scheduler selects for execution the activity to which the present scheduling graph node is dedicated, and these steps conclude. In step 3206, if the briefly blocked activity queue is empty, then the scheduler continues at step 3208, else the scheduler continues at step 3207. In step 3207, the scheduler selects for execution the activity at the head of the briefly blocked activity queue, and these steps conclude. In step 3208, the scheduler selects for execution any activity at the head of the circular activity queue. These steps then conclude.

Step 3203, discussed above, involves selecting the constraint at the head of an active constraint queue, and therefore the constraint in that constraint queue with the earliest deadline, for execution without regard for the constraint to which the present scheduling graph node iteration is allocated. While the scheduler's allocation of specific iterations of specific nodes to specific constraints is designed to ensure the successful execution of all accepted constraints, the same benefits can be achieved while retaining more flexibility for future execution by applying the earliest deadline first principle. According to the earliest deadline first principle, when selecting between projects to which to dedicate resources, the project having the earliest deadline should always be selected.

Figure 33:
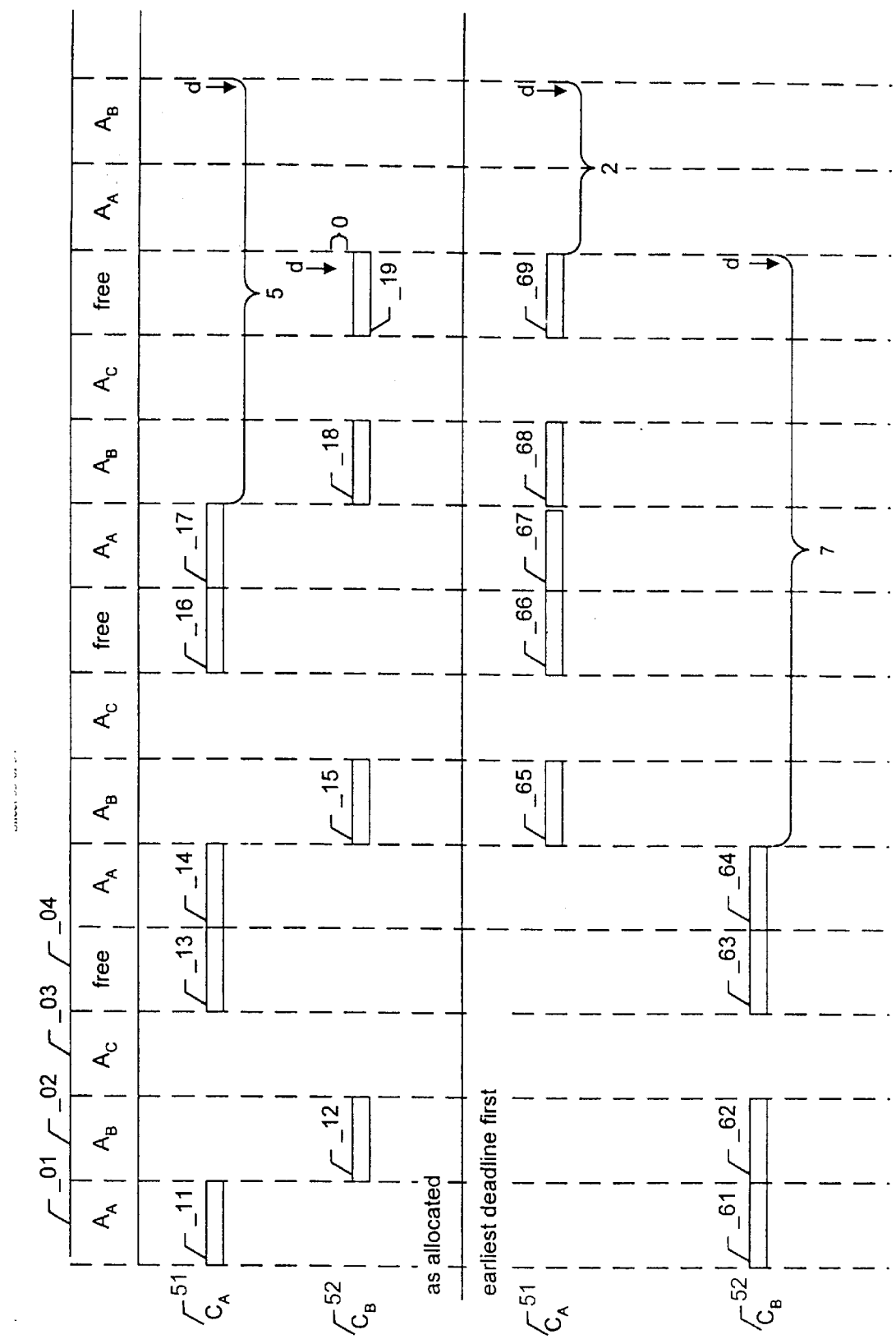
FIG. 33 is a timing diagram comparing the execution of constraints in earliest deadline first order with the execution of constraints in strict accordance with the allocation of scheduling graph node iterations.

FIG. 33 is a timing diagram comparing the execution of constraints in this earliest deadline first order with the execution of constraints in strict accordance with the allocations of the scheduling graph nodes. FIG. 33 summarizes the execution of two constraints, $C_A$ and $C_B$. Above the horizontal center line, FIG. 33 shows the execution of these constraints in strict accordance with the allocation of scheduling graph node iterations, and below the center horizontal line, the Figure shows the execution of the constraints in accordance with the earliest deadline of the first order. Constraint $C_B$ has an earlier deadline 3351, while constraint $C_A$ has a later deadline 3352. Each column corresponds to an iteration through a node allocated to constraint $C_A$, a node allocated to constraint $C_B$, a node dedicated to activity $A_C$, and a free node. Blocks occurring at the intersection of a row, corresponding to one of the two constraints, and a column, corresponding to an iteration through a node, indicates a period of time in which the constraint is executed. It can be seen that, using the as-allocated approach, constraint $C_A$ finishes 5 time units before its deadline, and constraint $C_B$ finishes 0 time units before its deadline, for an average of 2.5 time units. On the other hand, it can be seen that, using the earliest deadline first approach, constraint $C_A$ finishes 2 time units before its deadline, and constraint $C_B$ finishes 7 time units before its deadline, for an average of 4.5 time units. The above results demonstrate that the application of an earliest deadline first approach helps to complete constraints as early as possible before their deadlines, and thereby can provide flexibility for future scheduling. In an alternate embodiment, however, the scheduler uses the as-allocated approach in order to continue satisfying reservations for activities submitting constraints with regularity as discussed above in conjunction with FIGS. 26A and 26B.

Figure 34:
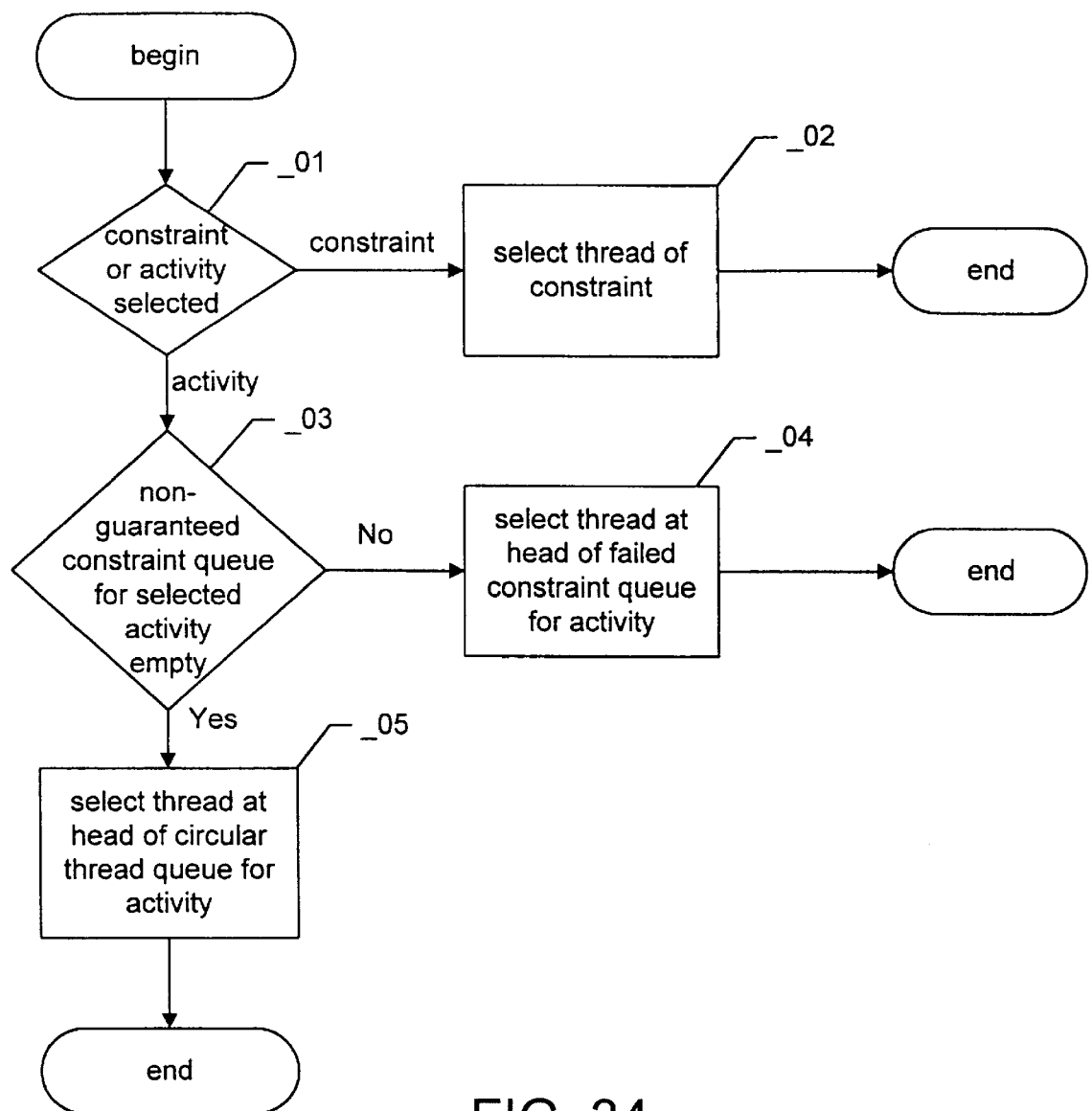
FIG. 34 is a flow diagram showing the steps preferably performed by the scheduler to select a thread of the selected constraint or activity to execute.

FIG. 34 is a flow diagram showing the steps preferably performed by the scheduler to select a thread of the selected constraint or activity to execute. In step 3401, if the scheduler selected a constraint in the steps shown in FIG. 32, then the scheduler selects the thread that submitted this constraint in step 3402 and these steps conclude, else if the scheduler selected an activity in the steps shown in FIG. 32, the scheduler continues in step 3403. In step 3403, if the non-guaranteed constraint queue for the activity selected in the steps shown in FIG. 32 is empty, then the scheduler continues at step 3405, else the scheduler continues at step 3404 to select the thread at the head of the non-guaranteed constraint queue for the selected activity and the steps conclude. In step 3405, the scheduler selects the thread at the head of the circular thread queue for the selected activity, when the steps conclude.

Constraints are each originally submitted by a single thread. The scheduler will transform a thread constraint into an activity constraint if the thread submits a request to end the constraint before its execution time estimate is exhausted. While the scheduler can execute any of the threads of the activity specified by an activity constraint when the activity constraint is selected for execution, thread constraints each specify a single thread that may be executed when the thread constraint is selected for execution. The identity of the thread specified by a thread constraint may, however, be temporarily changed to a thread other than the submitting thread to improve the submitting thread's opportunity to execute. This process is described as "inheriting" the thread constraint from the submitting thread to an inheriting thread. During the period of inheritance, when the inherited thread constraint is selected for execution, the scheduler executes the inheriting thread instead of the submitting thread.

Synchronization mechanisms are a feature of multitasking operating systems that coordinate the use of a particular resource of the computer system by different threads. A mutual exclusion semaphore ("mutex") is a synchronization mechanism used to coordinate the use of a resource that may only be used by one thread at a time. In order to coordinate the use of such a resource, any thread that needs to use the resource must attempt to "acquire" the mutex before using the resource, and must release the mutex after it has finished using the resource. If, when the thread attempts to acquire the mutex, the mutex is not "owned" by any other thread, the thread attempting to acquire the mutex is allowed to do so and immediately begin using the resource. On the other hand, if the mutex is owned by another thread when the thread attempts to acquire it, the operating system "blocks," or suspends the execution of, the thread attempting to acquire the mutex, until the mutex becomes available and the operating system allows the thread to acquire the mutex.

When a thread that is executing under a thread constraint blocks on an owned mutex, the scheduler cannot execute this thread even when its constraint is selected for execution—this thread must remain blocked until the thread owning the mutex releases it. In order to expedite the owning thread's release of the mutex in cases in which the blocked thread must be executed soon in order to satisfy its constraint, the scheduler preferably inherits the constraint of the blocked thread to the owning thread. During the period of inheritance, when the scheduler selects the constraint for execution, it executes the inheriting thread instead of the blocked thread. The time for which the inheriting thread executes during the period of inheritance is deducted from the estimate for the constraint. When the owning thread finishes its use of the resource and releases the mutex and the blocked thread is unblocked and allowed to acquire the mutex, the period of inheritance ends, and the unblocked thread is again executed when the constraint is selected for execution. Inheritance of constraints in this manner is transitive—that is, in cases in which the inheriting thread itself blocks on a mutex owned by a third thread, the scheduler inherits the constraint to this third thread in the same manner.

While this invention has been shown and described with reference to preferred embodiments, it will be understood by those skilled in the art that various changes or modifications in form and detail may be made without departing from the scope of the invention. For example, the foregoing describes the construction and use of scheduling graphs in which branches in one level of the scheduling graph each split into two branches in the succeeding level of the scheduling graph. Indeed, those skilled in the art will recognize that one branch in the level of the scheduling graph can be straightforwardly split into any number of branches in the succeeding level. In fact, different branches could be split into different numbers of subbranches within the same scheduling graph. Those skilled in the art will further appreciate that each root-to-leaf path could be weighted to be traversed any specified number of times during one complete traversal of the scheduling graph, instead of being traversed only once during a complete traversal of the scheduling graph as described.

We claim:

1. A method in a computer system for scheduling the execution of activities at different frequencies, each activity being comprised of one or more threads, the method comprising the steps of:

receiving, for each of a plurality of activities, a reservation specifying an amount of execution time and an execution window, the execution window identifying a length of time such that, during every period of time having that length, the threads of the activity are executed for at least the specified amount of execution time; and in response to the receiving step, constructing a graph for scheduling the execution of the activities that is comprised of nodes each representing a recurring execution interval, the graph having one root, one or more leaves, and at least one path from the root to each leaf, each node being on at least one path from the root to a leaf, the number of times the execution interval represented by each node occurs during a single complete traversal of the graph being equal to the number of paths from the root to a leaf that the node is on, each node having associated with it an execution interval length, the total execution interval lengths of the nodes on each path from the root to a leaf not exceeding a maximum total interval, and, for each reservation, nodes being dedicated to the execution of the threads of the activity specified by the reservation that have a total execution interval at least as large as the amount specified by the reservation and that are on at least as many of the paths from the root to a leaf as the product of the total number of paths and the quotient of the maximum total interval divided by the execution window specified by the reservation, the constructed graph being usable to schedule the execution of activities in satisfaction of the received reservations by traversing the graph and, for each node visited in the traversal, executing one or more of the threads of the activity to which the node is dedicated for a period of time substantially equal to the execution interval length of the node.

2. The method of claim 1, further including the steps of:

completely traversing the constructed graph by visiting the nodes of the graph along each path from the root of the graph to a leaf of the graph; and for each node of the graph visited during the traversal, executing one or more of the threads of the activity to which the node is dedicated for the time interval specified for the node.

3. The method of claim 2 wherein the traversing and executing steps are repeated multiple times.

4. The method of claim 2 wherein each activity has exactly one thread that is executed in the executing step.

5. A method in a computer system having a processor for scheduling the execution of a plurality of activities each having one or more threads, the method comprising the steps of:

accessing an activity scheduling graph comprised of nodes each representing a recurring execution interval, the graph having one root, one or more leaves, and at least one path from the root to each leaf, each node being on at least one path from the root to a leaf, the number of times the execution interval represented by each node occurs during the traversal of the graph being equal to the number of paths from the root to a leaf that the node is on, each node having associated with and being adapted to being dedicated to executing the threads of a single activity;

selecting a current node within the accessed graph;

when the processor becomes available, advancing from the current node to a new current node in accordance with a root-to-leaf traversal of the graph; and executing the one or more threads of the activity to which the new current node is dedicated for the execution interval length associated with the new current node.

6. The method of claim 5, further including the step of repeating the advancing and executing steps multiple times to traverse a plurality of nodes and execute the threads of the activities to which the traversed nodes are dedicated.

7. A computer-readable medium whose contents cause a computer system having a processor to schedule the execution of a plurality of activities each having one or more threads by performing the steps of:

accessing an activity scheduling graph comprised of nodes each representing a recurring execution interval, the graph having one root, one or more leaves, and at least one path from the root to each leaf, each node being on at least one path from the root to a leaf, the number of times the execution interval represented by each node occurs during the traversal of the graph being equal to the number of paths from the root to a leaf that the node is on, each node having associated with and being adapted to being dedicated to executing the threads of a single activity;

selecting a current node within the accessed graph;

when the processor becomes available, advancing from the current node to a new current node in accordance with a root-to-leaf traversal of the graph; and executing the one or more threads of the activity to which the new current node is dedicated for the execution interval length associated with the new current node.

8. A method in a computer system for scheduling units of execution of one or more activities, the method comprising the steps of:

receiving a request from a plurality of activities to be scheduled, each request specifying a reservation window and an execution time for one of the plurality of activities to be scheduled;

constructing a scheduling graph based on the received requests, a node in the scheduling graph indicating an activity that will be executed at each of a plurality of future times for a specified time interval; and executing the units of execution in the activity in accordance with the scheduling graph such that the execution timing requests are satisfied.

9. A computer-readable medium whose contents cause a computer system to schedule the execution of units of execution of one or more activities by performing the steps of:

receiving requests from a plurality of activities to be scheduled, each request specifying a reservation window and an execution time for one of the plurality of activities to be scheduled;

constructing a scheduling graph based on the received requests, a node in the scheduling graph indicating an activity that will be executed at each of a plurality of future times for a specified time interval; and executing the units of execution in the activity in accordance with the scheduling graph such that the execution timing requests are satisfied.

10. A computer memory containing a scheduling graph data structure for scheduling the execution of activities at different frequencies, each activity being comprised of one or more threads, the scheduling graph having one root, one or more leaves, and at least one path from the root to each leaf, each node being on at least one path from the root to a leaf, the number of times the execution interval represented by each node occurs during a single complete traversal of the graph being equal to the number of paths from the root to a leaf that the node is on, each node having associated with it an execution interval length, the total execution interval lengths of the nodes on each path from the root to a leaf not exceeding a maximum total interval, nodes being dedicated to the execution of the threads of each activity having a total execution interval, the graph being usable to schedule the execution of activities at different frequencies by traversing the graph in a root-to-leaf manner and, for each node visited in the traversal, executing one or more of the threads of the activity to which the node is dedicated for a period of time substantially equal to the execution interval length of the node, such that activities whose nodes are on a greater number of paths are executed with greater frequency.

* * * * *

UNITED STATES PATENT AND TRADEMARK OFFICE
CERTIFICATE OF CORRECTION

PATENT NO. : 6,317,774 B1
DATED : November 13, 2001
INVENTOR(S) : Jones et al.

It is certified that error appears in the above-identified patent and that said Letters Patent is hereby corrected as shown below:

Title page,
Item [56], References Cited, OTHER PUBLICATIONS, add
 -Compton et al., "Collaborative Load Shedding," in Proceedings of the Workshop on the Role of Real-Time in Multimedia/Interactive Computing Systems, IEEE Computer Society, Raleigh-Durham, NC, Nov. 1993, pp.1-7.
 -Liu et al., "Scheduling Algorithms for Multiprogramming in a Hard-Real-Time Environment," Journal of the ACM 20(1):46-61, 1973.
 -Northcutt, J. Duane, "The Alpha Operating System: Requirements and Rationale," Archons Project Technical Report #88011, Dept. of Computer Science, Carnegie-Mellon, Jan. 1988, pp. 1-70.
 -Schwan et al., "Dynamic Scheduling of Hard Real-Time Tasks and Real-Time Threads," IEEE Transactions on Software Engineering 18(8):736-748, 1992.
 -Sha et al., "Priority Inheritance Protocols : An Approach to Real-Time Synchronization," IEEE Transactions on Computers 39(9):1175-1185, 1990.
 -Sommer et al., "Operating System Extensions for Dynamic Real-Time Applications," in Proceedings of the Real-Time Systems Symposium, Washington, DC, Dec. 1996, pp. 45-50.
 -Stankovic et al., "The Spring Kernel : A New Paradigm for Real-Time Systems," IEEE Software 8(3) :62-72, 1991.
 -Wall et al., "Bus Bandwidth Management in High Resolution Video Workstation," in Proceedings of the Third International Workshop on Network and Operating System Support for Digital Audio and Video, IEEE Computer Society, San Diego, CA, Nov. 1992, pp. 236-250.

Column 2,
Line 2, "withour" should read -- without --.

Column 19,
Line 1, "2750(FIG.27)" should read -- 3150(FIG.31) --.

Signed and Sealed this

Fourteenth Day of December, 2004

JON W. DUDAS
*Director of the United States Patent and Trademark Office*